US011961499B2

(12) United States Patent
Oba et al.

(10) Patent No.: US 11,961,499 B2
(45) Date of Patent: Apr. 16, 2024

(54) SOUND SIGNAL GENERATION DEVICE, KEYBOARD INSTRUMENT AND SOUND SIGNAL GENERATION METHOD

(71) Applicant: YAMAHA CORPORATION, Hamamatsu (JP)

(72) Inventors: Yasuhiko Oba, Hamamatsu (JP); Akihiko Komatsu, Hamamatsu (JP); Michiko Tanoue, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 579 days.

(21) Appl. No.: 17/200,138

(22) Filed: Mar. 12, 2021

(65) Prior Publication Data

US 2021/0201869 A1 Jul. 1, 2021

Related U.S. Application Data

(63) Continuation of application No. PCT/JP2018/034261, filed on Sep. 14, 2018.

(51) Int. Cl.

*G10H 1/14* (2006.01)
*G10H 1/00* (2006.01)
*G10H 1/057* (2006.01)
*G10H 1/34* (2006.01)

(52) U.S. Cl.

CPC ............. *G10H 1/14* (2013.01); *G10H 1/0008* (2013.01); *G10H 1/057* (2013.01); *G10H 1/348* (2013.01)

(58) Field of Classification Search

CPC ........ G10H 1/14; G10H 1/0008; G10H 1/057; G10H 1/348

See application file for complete search history.

(56) References Cited

U.S. PATENT DOCUMENTS 5,824,930 A 10/1998 Ura et al.
6,576,826 B2 * 6/2003 Kondo .................. G10H 1/183 84/743
2007/0289435 A1 12/2007 Tajika

FOREIGN PATENT DOCUMENTS

CN 1163445 A 10/1997
JP H0337499 U * 4/1991
JP H04134495 A 5/1992
JP H06138876 A 5/1994

(Continued)

OTHER PUBLICATIONS

Office Action issued in Chinese Appln. No. 201880097502.7 dated Sep. 28, 2023. English translation provided.

(Continued)

*Primary Examiner* — Jianchun Qin
(74) *Attorney, Agent, or Firm* — ROSSI, KIMMS & McDOWELL LLP

(57) ABSTRACT

A sound signal generation method for a keyboard including a pedal and a key, the method according to an embodiment of the present disclosure comprises generating a first sound signal and a second sound signal different from the first sound signal based on first operation data corresponding to an operation of the key, and adjusting a relationship between the first sound signal and the second sound signal to sound at respective timings according to a physical quantity of a key pressing operation of the key to control a decay rate of the first sound signal to be different from a decay rate of the second sound signal based on a key release operation of the key.

16 Claims, 18 Drawing Sheets

(56) References Cited

FOREIGN PATENT DOCUMENTS

| | | | |
|---|---|---|---|
| JP | 2007322871 | A | 12/2007 |
| JP | 2008033111 | A | 2/2008 |
| JP | 2009025477 | A | 2/2009 |
| JP | 2014059534 | A | 4/2014 |

OTHER PUBLICATIONS

English translation of Written Opinion issued in Intl. Appln. No. PCT/JP2018/034261 dated Dec. 4, 2018, previously cited in IDS filed Mar. 12, 2021.

International Search Report issued in Intl. Appln. No. PCT/JP2018/034261 dated Dec. 4, 2018. English translation provided.

Written Opinion issued in Intl. Appln. No. PCT/JP2018/034261 dated Dec. 4, 2018.

Office Action issued in Japanese Appln. No. 2020-546663 dated Dec. 13, 2022. English translation provided.

Office Action issued in Chinese Appln. No. 201880097502.7, mailed on Jan. 30, 2024. English machine translation provided.

* cited by examiner

SOUND SIGNAL GENERATION DEVICE, KEYBOARD INSTRUMENT AND SOUND SIGNAL GENERATION METHOD

CROSS-REFERENCE TO RELATED APPLICATIONS

This application is a U.S. continuation application filed under 35 U.S.C. § 111(a), of International Application No. PCT/JP2018/034261, filed on Sep. 14, 2018, the disclosures of which are incorporated by reference.

FIELD

The present disclosure relates to a technique for generating a sound signal.

BACKGROUND ART

In order to make a sound from an electronic piano as close as possible to a sound of an acoustic piano, various contrivances have been made. When pressing the key in the performance of the acoustic piano, not only string striking sound occurs, also occurs key bed collision sound that occurs with the pressing of the key. For example, in Japanese laid-open patent publication No. 2014-59534, techniques have been disclosed for reproducing such a key bed collision sound in electronic instruments such as an electronic piano.

SUMMARY

According to an embodiment of the present disclosure, a sound signal generation device for a keyboard including a pedal and a key, the sound signal generation device including at least one memory storing instructions and a processor that implements the instructions to generate a first sound signal and a second sound signal different from the first sound signal based on first operation data corresponding to a first operation of the key, and adjust a relationship between the first sound signal and the second sound signal based on the first operation data to control a decay rate of the first sound signal to be different from a decay rate of the second sound signal based on second operation data corresponding to an operation on the pedal.

According to an embodiment of the present disclosure, a sound signal generation device for a keyboard including a pedal and a key, the sound signal generation device including at least one memory storing instructions and a processor that implements the instructions to generate a first sound signal and a second sound signal different from the first sound signal based on first operation data corresponding to an operation of a key, from among the at least one key, and to adjust a relationship between the first sound signal and the second sound signal to sound at respective timings according to a physical quantity of a key pressing operation of the key to control a decay rate of the first sound signal to be different from a decay rate of the second sound signal based on a key release operation of the key.

According to an embodiment of the present disclosure, a keyboard instrument including the key, the pedal, a first detection unit that outputs the first operation data corresponding to the operation of the key, and a second detection unit that outputs the second operation data corresponding to the operation on the pedal.

According to an embodiment of the present disclosure, a sound signal generation method for a keyboard including a pedal and a key, the method including generating a first sound signal and a second sound signal different from the first sound signal based on first operation data corresponding to an operation of the key, and adjusting a relationship between the first sound signal and the second sound signal to sound at respective timings according to a physical quantity of a key pressing operation of the key to control a decay rate of the first sound signal to be different from a decay rate of the second sound signal based on a key release operation of the key.

DESCRIPTION OF EMBODIMENTS

Figure 1:
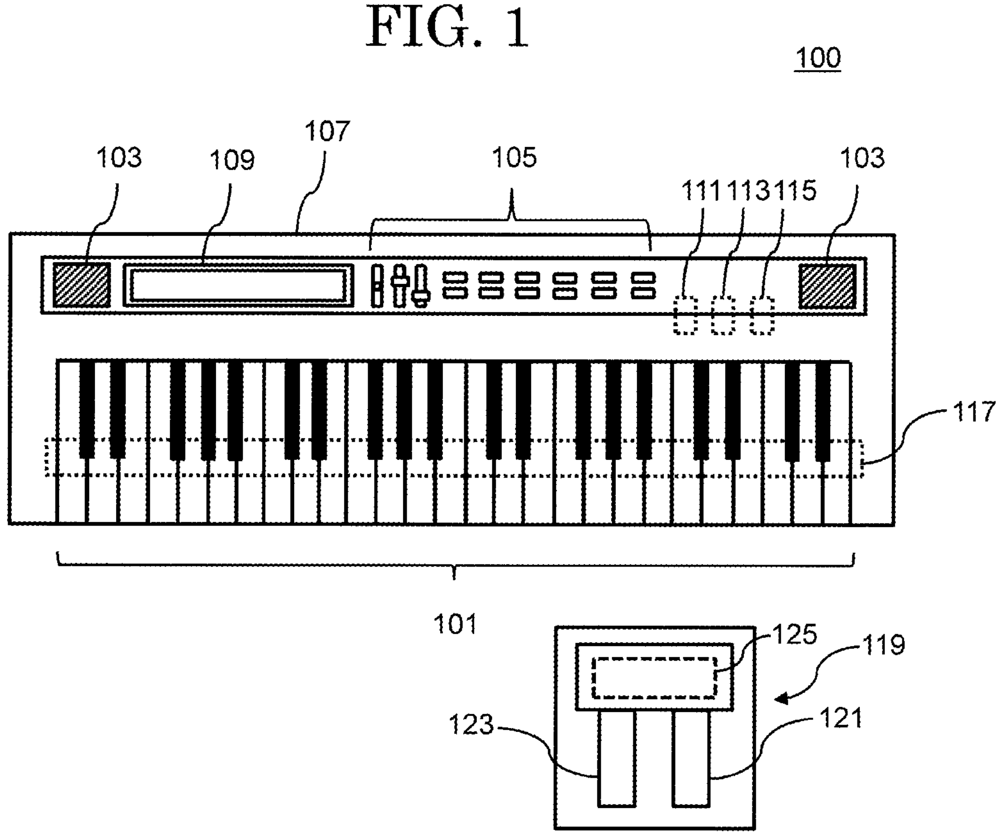
FIG. 1 is a diagram showing a configuration of a keyboard instrument according to an embodiment of the present disclosure.

Hereinafter, a keyboard instrument according to an embodiment of the present disclosure will be described in detail referring to the drawings. The following embodiments are exemplary embodiments of the present disclosure, and the present disclosure is not construed within the limitations of these exemplary embodiments. In the drawings referred to in the present exemplary embodiments, the same portions or portions having similar functions are denoted by the identical symbols or similar symbols (symbols each formed simply by adding A, B, etc. to the end of a number), and a repetitive description thereof may be omitted.

First Embodiment

[Configuration of keyboard instrument] FIG. 1 is a diagram showing a configuration of a keyboard instrument according to the first embodiment of the present disclosure. A keyboard instrument 100 is an electronic keyboard instrument such as an electronic piano and is an exemplary electronic instrument having a plurality of keys 101 as performance operating elements. When a user operates the key 101, a sound comes out from a speaker 103. The user can change the sound type (timbre) using an operation unit 105. According to the technics disclosed in Japanese laid-open patent publication No. 11-250874, it is possible to output sounds including a key bed collision sound generated when a key collides with a key bed when a key is depressed. In an electronic piano, it is possible to reproduce a sound similar to the sound of an acoustic piano by reproducing the key bed collision sound. In order to reproduce a sound similar to an acoustic piano, an electronic piano requires the reproduction of actual key bed collision sound by an acoustic piano. In this example, the keyboard instrument 100 can generate a sound similar to an acoustic piano when generating a sound using the timbre of the piano. Each configuration of the keyboard instrument 100 will be described in detail.

The keyboard instrument 100 includes the plurality of keys 101 (the performance operating elements) in a housing 107 and a separate pedal device 119. The plurality of keys 101 are rotatably supported by the housing 107. The speaker 103 is provided on the housing 107. Inside the housing 107, a control unit 111, a memory unit 113, a sound generator 115, and a first detection unit 117 are provided. The pedal device 119 includes a damper pedal 121 and a second detection unit 125. The pedal device 119 includes a shift pedal 123 but may be omitted. The configurations provided inside the housing 107 are connected via buses.

In this example, the keyboard instrument 100 includes an interface for inputting and outputting signals to and from an external device. The interface may be, for example, a terminal for outputting sound signals, a cable connecting terminal for transmitting and receiving MIDI data, or the like. In this example, the pedal device 119 is connected to the interface so that the second detection unit 125 is connected to the configurations arranged inside the housing 107 via the buses described above, and the signals are exchanged between the pedal device and the keyboard instrument.

The control unit 111 includes a calculation processing circuit such as CPU, and a memory device such as RAM and ROM. The control unit 111 implements a control program stored in the memory unit 113 by the CPU to realize various functions in the keyboard instrument 100. The operation unit 105 is a device such as an operation button, a touch sensor, and a slider, and outputs a signal corresponding to the input operation to the control unit 111. A display unit 109 displays a screen based on the control by the control unit 111.

The memory unit 113 is a memory device such as non-volatile memory. The memory unit 113 stores control programs implemented by the control unit 111. The memory unit 113 may store parameters, waveform data, and the like used in the sound generator 115. The speaker 103 outputs a sound corresponding to the sound signal by amplifying and outputting the sound signal output from the control unit 111 or the sound generator 115. Although FIG. 1 shows a case where the two speakers 103 are provided on the keyboard instrument 100, the number of the speakers 103 is not limited to two. When an external speaker is used, the speaker 103 can be omitted.

The first detection unit 117 detects operations including the key pressing operation and the key release operation of the key 101. The first detection unit 117 measures the behavior of each of the plurality of keys 101, and outputs measurement data indicating the measurement results. The first detection unit 117 outputs a key number Kc which is information indicating the pressed key 101, information Ks indicating the depressed amount (operation amount) of the key 101, and information Kv indicating the speed (pressed speed) of the key 101 as the measurement data. By outputting the key number Kc, the information Ks, and the information Kv in association with each other, the operated key 101 and the operation for the key 101 are specified. The mechanical structure (key assembly) interlocking with the key 101 will be described in detail. The information Ks is detected by a continuous amount and may be one that outputs a value corresponding to the position or may be one that outputs the position with a status of on/off by a switch of two contacts, or three contacts.

Figure 2:
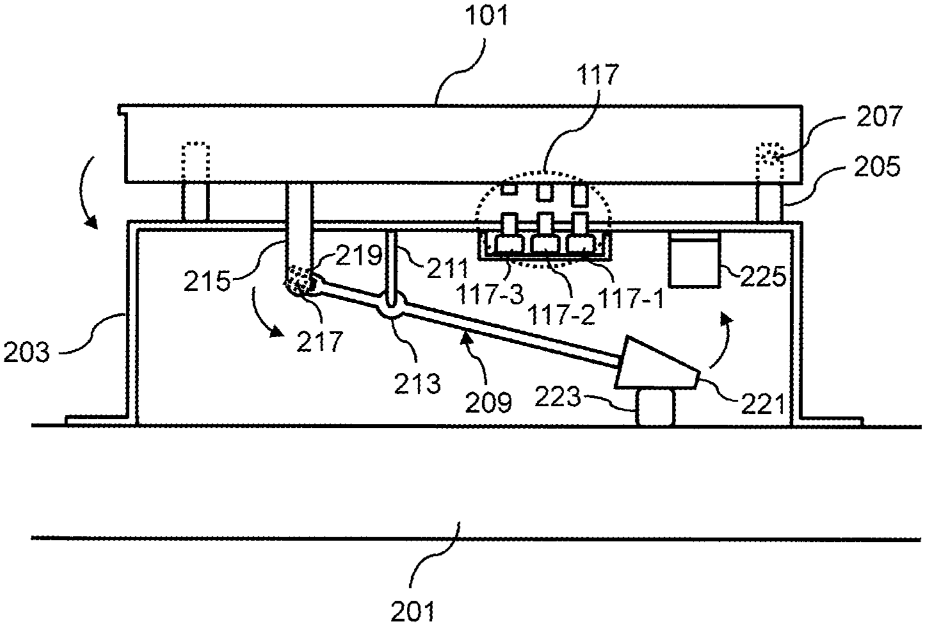
FIG. 2 is a diagram showing a key assembly of a keyboard instrument according to an embodiment of the present disclosure.

FIG. 2 is a diagram showing a mechanical structure (key assembly) interlocking with the key 101 of the keyboard instrument 100 according to the first embodiment of the present disclosure. In FIG. 2, a structure relating to a white key of the keys 101 will be described as an example. A key bed 201 is a member that constitutes a part of the housing 107 described above. A frame 203 is fixed to the key bed 201. A key support member 205 protruding upward from the frame 203 is arranged on the upper portion of the frame 203. The key support member 205 rotatably supports the key 101 about a shaft 207. A fixing member 211 protruding downward from the frame 203 is provided. A support member 209 is provided on the frame 203 at the other side of the key 101. The fixing member 211 rotatably fixes the support member 209 about a shaft 213.

The support member connection part 215 protruding downward from the key 101 includes a connection part 217 at the lower end. A key connection part 219 and the connection part 217 provided at one end of the support member 209 are connected to slidable. The support member 209 is provided with a weight 221 on the opposite side of the key connection 219 to the shaft 213. When the key 101 is not operated, the weight 221 is placed on a lower limit stopper 223 by its own weight.

On the other hand, when the key 101 is depressed, the key connection part 219 moves downward, and the support member 209 rotates. When the support member 209 rotates, the weight 221 moves upward. When the weight 221 collides with an upper limit stopper 225, the rotation of the support member 209 is limited and the depressing of the key 101 stops.

The key assembly is not limited to the structure shown in FIG. 2. The key assembly may, for example, omit the frame 203. As shown in FIG. 2, the key assemblies may have a structure in which when the key 101 is depressed, the key 101 or a member that moves interlocking with the key 101 comes into contact with the key bed 201 or a member connected to the key bed 201. Operation of the key 101 may be detected by operation of the support member 209 instead of the key 101.

The first detection unit 117 is provided between the frame 203 and the key 101. The first detection unit 117 may include a first sensor 117-1, a second sensor 117-2, and a third sensor 117-3. When the key 101 is depressed, the first sensor 117-1 outputs a first detection signal K1 when the key 101 reaches the first press level. Subsequently, the second sensor 117-2 outputs a second detection signal K2 when the key 101 reaches the second press level. Furthermore, the third sensor 117-3 outputs a third detection signal K3 when the key 101 reaches the third press level. This temporal difference in the output timings of the detection signals can be used to calculate the press speed of the key 101.

In the present embodiment, as an example, the control unit 111 calculates a first press speed based on the time from the output timing of the first detection signal to the output timing of the second detection signal, and a predetermined distance (here, the distance between the first press level and the second press level). Similarly, the control unit 111 calculates a second press speed based on the time from the output timing of the second detection signal to the output timing of the third detection signal, and a predetermined distance (here, the distance between the second press level and the third press level). The control unit 111 may calculate the pressing acceleration based on the first press speed and the second press speed. Further, the control unit 111 outputs a note-on signal Non to the sound generator 115 by detecting the third detection signal, and when the output of the first signal for the same key is stopped after outputting note-on signal Non, outputs a note-off signal Noff to the sound generator 115.

When the note-on signal Non is output, the key number Kc indicating the pressed key 101, the information Ks indicating the depressed amount (operation amount) of the key 101, and the information Kv indicating the speed (pressed speed) of the key 101 are output as the measurement data from the first detection unit 117. At this time, the measurement data may include information Ka indicating the pressing acceleration of the key 101. On the other hand, when the note-off signal Noff is output, the information Kc indicating the released key 101 is output in association with the note-off signal Noff. In the following explanation, these pieces of information (measurement data) output from the control unit 111 in accordance with the operation of the key 101 are supplied to the sound generator 115.

Referring back to FIG. 1, the second detection unit 125 measures the operation of the damper pedal 121 and outputs the measurement data indicating the measurement result. This measurement data includes information Ps indicating the pushing amount of the damper pedal 121. The operation (pushing amount) for the damper pedal 121 is specified by this information Ps. When the pedal device 119 includes the shift pedal 123, the second detection unit 125 outputs information Pc indicating whether the operated pedal is the damper pedal 121 or the shift pedal 123 in association with the information Ps as the measurement data. By outputting the information Pc and the information Ps in association in each other, the operated pedal (the damper pedal 121 or the shift pedal 123) and the operation (pushing amount) for the pedal are specified. If the pedal of the pedal device 119 is only the damper pedal 121, the information Pc is omitted.

The sound generator 115 generates the sound signal based on the information input from the first detection unit 117 and second detection unit 125 and outputs the sound signal to the speaker 103. The sound signal generated by the sound generator 115 is obtained for each operation of the key 101 and the damper pedal 121. Then, a plurality of sound signals obtained by the plurality of key depressions are synthesized and output from the sound generator 115. The configuration of the sound generator 115 will be described in detail.

Figure 3:
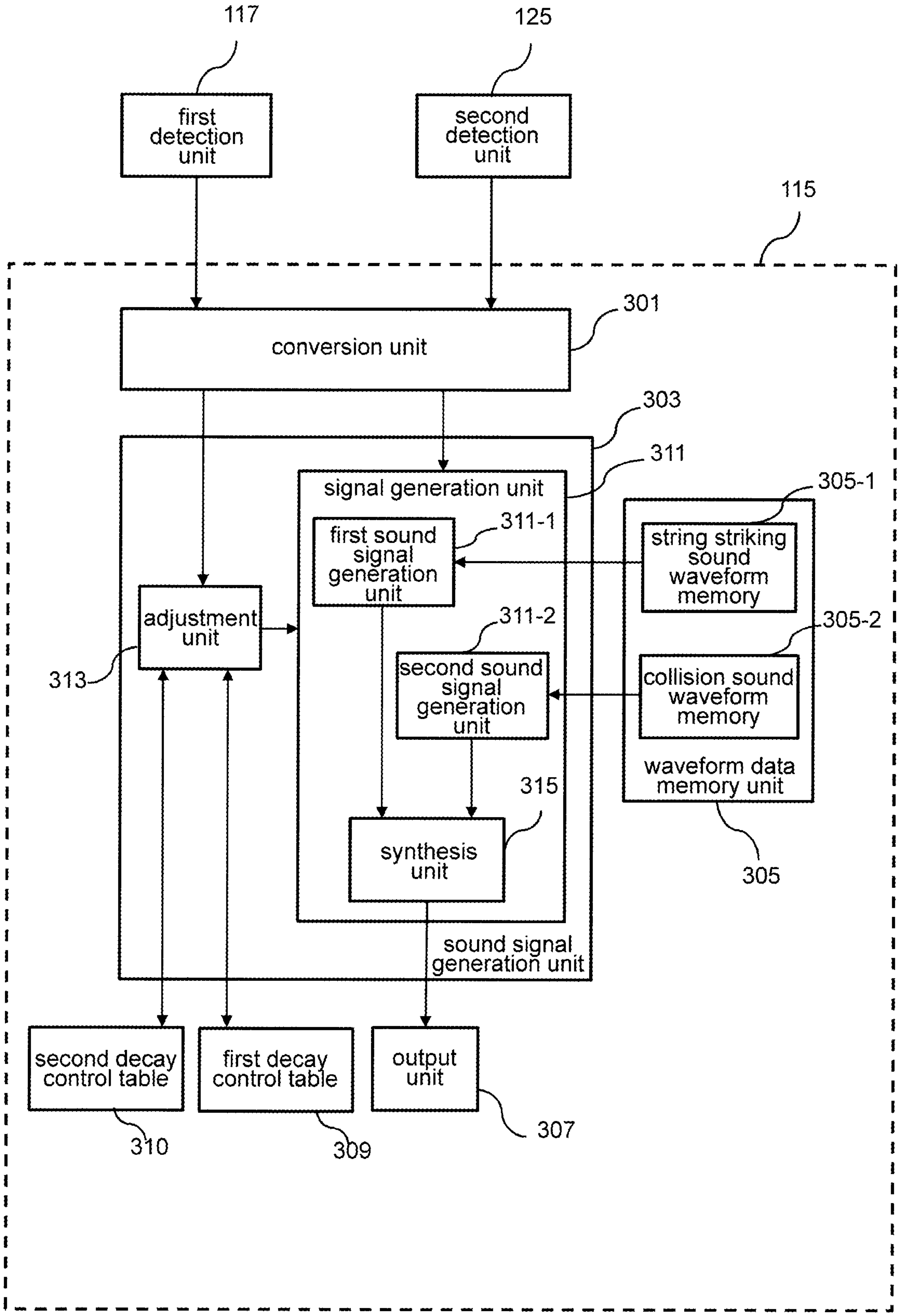
FIG. 3 is a block diagram showing a functional configuration of a sound generator according to an embodiment of the present disclosure.

FIG. 3 is a block diagram showing a functional configuration of the sound generator 115 according to the first embodiment of the present disclosure. The sound generator 115 includes a conversion unit 301, a sound signal generation unit 303 (a sound signal generation device), a waveform data memory unit 305, an output unit 307, a first decay control table 309, and a second decay control table 310. The sound signal generation unit 303 includes a signal generation unit 311 and an adjustment unit 313.

The conversion unit 301 generates data (hereinafter, referred to as first operation data) corresponding to the operation on the key 101 based on the information (Kc, Ks, Kv) input from the first detection unit 117. The conversion unit 301 generates data (hereinafter, referred to as second operation data) corresponding to the operation (pushing amount) of the damper pedal 121 based on the information Ps (or the information Pc and Ps) input from the second detection unit 125.

The waveform data memory unit 305 includes a string striking sound waveform memory 305-1 and a collision sound waveform memory 305-2. The string striking sound waveform memory 305-1 stores a plurality of string striking sound waveform data which is the original waveform data of the first sound signal (the string striking sound signal) generated in the signal generation unit 311. The string striking sound waveform data is the waveform data obtained by sampling the sound caused by the string striking accompanied by the key depression. The collision sound waveform memory 305-2 stores a plurality of collision sound waveform data which is the original waveform data of the second sound signal (the collision sound signal). The collision sound waveform data is waveform data obtained by sampling the key bed collision sound of the acoustic piano (sound generated by the collision of the key and the key bed when the key is depressed). The waveform data of the respective velocity values corresponding to the respective pitches is stored string striking sound waveform data. The collision sound waveform data is stored as shared for all pitches, corresponding to the respective velocity values.

The signal generation unit 311 generates and outputs a sound signal based on the first operation data input from the conversion unit 301. More specifically, the signal generation unit 311 includes a first sound signal generation unit 311-1, a second sound signal generation unit 311-2, and a synthesis unit 315. The first sound signal generation unit 311-1 generates and outputs the first sound signal (the string striking sound signal) based on the first operation data. The second sound signal generation unit 311-2 generates and outputs a second sound signal (the collision sound signal) based on the first operating data. At this time, the envelopes of the first sound signal and the second sound signal are adjusted by the adjustment unit 313. The synthesis unit 315 synthesizes the envelope-adjusted first sound signal and the envelope-adjusted second sound signal and outputs it to the output unit 307.

The output unit 307 outputs the synthesized sound signal obtained by synthesizing the first sound signal and the second sound signal obtained from the signal generation unit 311 to the outside of the sound generator 115. In the present embodiment, the synthesized sound signal is output to the speaker 103 and is listened to by the user. Next, the configuration of the signal generation unit 311 will be described in detail.

Figure 4:
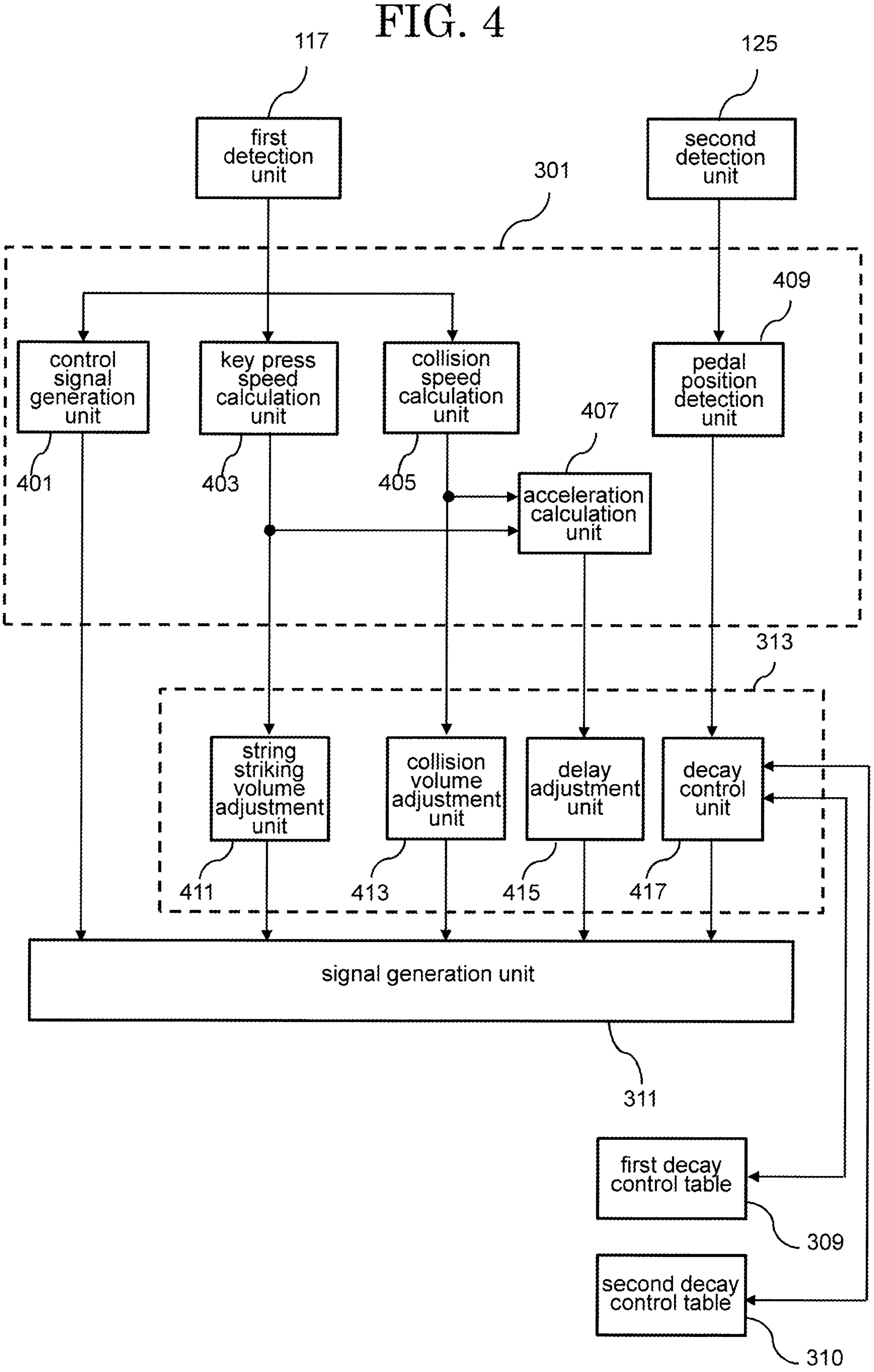
FIG. 4 is a block diagram illustrating a functional configuration of a conversion unit and an adjustment unit according to an embodiment of the present disclosure.

FIG. 4 is a block diagram illustrating a functional configuration of the conversion unit 301 and the adjustment unit 313. The conversion unit 301 includes a control signal generation unit 401, a key press speed calculation unit 403, a collision speed calculation unit 405, an acceleration calculation unit 407, and a pedal position detection unit 409. The adjustment unit 313 includes a string striking volume adjustment unit 411, the collision volume adjustment unit 413, a delay adjustment unit 415, and a decay control unit 417. Hereinafter, the configuration of the conversion unit 301 will be described in detail.

The control signal generation unit 401 generates control data (hereinafter, referred to as first operation data) defining the content of sound generation based on the information (Kc, Ks, Kv) output from the first detection unit 117. The first operation data is, in this example, data in the form of MIDI and includes a note number Note, a velocity Vel, a note-on signal Non, and a note-off signal Noff. The generated first operation data is output to the signal generation unit 311 and the adjustment unit 313. When the third detection signal K3 is output from the first detection unit 117, the control signal generation unit 401 generates the note-on signal Non. That is, when the key 101 is depressed and reached the third press level, the note-on signal Non is output. The target note number Note is determined based on the key number Kc output corresponding to the third detection signal K3.

The control signal generation unit 401 generates the note-off signal Noff when the outputting of the first detection signal K1 of the corresponding key number Kc is stopped after generating the note-on signal Non. That is, when the press level of the key 101 returns to the first press level when the depressed key 101 returns to the rest position, the note-off signal Noff is generated.

The key press speed calculation unit 403 calculates the speed at a predetermined position of the depressed key 101 based on the information output from the first detection unit 117. This speed will be referred to as key press speed in the following description. The key press speed calculation unit 403, here, calculates the key press speed by a predetermined calculation using a first time from when the key 101 reaches the first press level until when it reaches the second press level. Here, the key press speed is a value obtained by multiplying the reciprocal of the first time by a predetermined constant. The key press speed calculation unit 403 outputs the calculated key press speed to the acceleration calculation unit 407 and the string striking volume adjustment unit 411 of the adjustment unit 313.

The collision speed calculation unit 405 calculates the speed at the end position of the depressed key 101 based on the information output from the first detection unit 117. This speed is referred to as the collision speed in the following description. The collision speed calculation unit 405, here, calculates the collision speed by a predetermined calculation using the first time described above and a second time from when the key 101 reaches the second press level until when it reaches the third press level. Here, the collision speed is calculated from the change of the second time relative to the first time as the change of the speed accompanying the change of the position of the key 101, and the speed at the end position, that is, the speed in the situation where the key bed collision sound is generated by the key 101, is estimated. The collision speed calculation unit 405 outputs the calculated collision speed to the acceleration calculation unit 407 and the collision volume adjustment unit 413 of the adjustment unit 313.

The acceleration calculation unit 407 calculates the amount of change (hereinafter referred to as pressing acceleration) between the press speed and the collision speed. The pressing acceleration may be calculated based on the change between the first time and the second time. The acceleration calculation unit 407 outputs the calculated acceleration to the delay adjustment unit 415 of the adjustment unit 313.

The pedal position detection unit 409 generates control data (hereinafter, referred to as second operation data) corresponding to the operation (pushing amount) of the damper pedal 121 based on the information Ps (or the information Pc and Ps) input from the second detection unit 125. The second operation data includes information indicating three states in the pedal operating range: an off state, which is a predetermined range from a state where the pedal is not operated (the rest position), an on state, which is a predetermined range of the stroke of the pedal up to a state where the pedal is fully depressed (the end position), and a half state that is a state between the off state and the on state. These three states, respectively, in an acoustic piano, indicate a state where the damper is separated from the string (damper on), a state where the damper is in contact with the string (damper off), and a state where the damper is separate to the extent that it touches when the string vibrates (half damper), etc. The pedal is operable in the range from the rest position to the end position.

Here, in the acoustic piano, the damper on corresponds to a state where the damper is separated from the string and a state where the damper pedal 121 is positioned in a predetermined range (a range that is set in advance as being equivalent to that state) from the end position at its operation stroke. In the acoustic piano, the damper off corresponds to a state where the damper is in contact with the string and a state where the damper pedal 121 is positioned in a predetermined range (a range that is set in advance as being equivalent to that state) from the rest position at its operation stroke. The pedal position detection unit 409 outputs the second operation data to the decay control unit 417 of the adjustment unit 313. The control data corresponding to the shift pedal 123 may also be generated, but the description thereof is omitted here.

The adjustment unit 313 adjusts the relationship between the first sound signal (the string striking sound signal) and the second sound signal (the collision sound signal) generated in the signal generation unit 311 based on the first operation data input from the conversion unit 301. Specifically, the adjustment unit 313 adjusts the relationships of the timing of the sounding and the volume between the first sound signal and the second sound signal based on the first operation data. Further, the adjustment unit 313 refers to the first decay control table 309 and the second decay control table 310 and controls the envelopes of the first sound signal and the second sound signal based on the second operation data input from the conversion unit 301. In particular, the adjustment unit 313 controls the envelopes when the first sound signal and the second sound signal are decayed. Here, the adjustment unit 313 controls the decay speed based on the operation of the damper pedal 121, that is, the second operation data. At this time, the adjustment unit 313 controls a decay rate of the first sound signal to be different from a decay speed of the second sound signal. Hereinafter, the configuration of the adjustment unit 313 will be described in detail.

The string striking volume adjustment unit 411 determines a string striking volume specified value based on the key press speed obtained from the key press speed calculation unit 403. The string striking volume specified value is used to specify the volume of the first sound signal (the string striking sound signal) generated by the signal generation unit 311. Here, the larger the key press speed, the larger the string striking volume specified value. The string striking volume adjustment unit 411 outputs the determined string striking volume specified value to the signal generation unit 311.

The collision volume adjustment unit 413 determines a collision volume specified value based on the collision speed obtained from the collision speed calculation unit 405. The collision volume specified value is used to specify the volume of the second sound signal (the collision sound signal) generated by the signal generation unit 311. In this example, the larger the collision speed, the larger the collision volume specified value. The collision volume adjustment unit 413 outputs the determined collision volume specified value to the signal generation unit 311.

The delay adjustment unit 415 determines a string striking sound delay time td1 based on the pressing acceleration obtained from the acceleration calculation unit 407 referring to a string striking sound delay table. The delay adjustment unit 415 determines a collision sound delay time td2 based on the pressing acceleration referring to a collision sound delay table. The string striking sound delay time td1 indicates the delay time until the first sound signal (the string striking sound signal) is output from note-on Non. The collision sound delay time td2 indicates the delay time until the second sound signal (the collision sound signal) is output from note-on Non.

Figure 5:
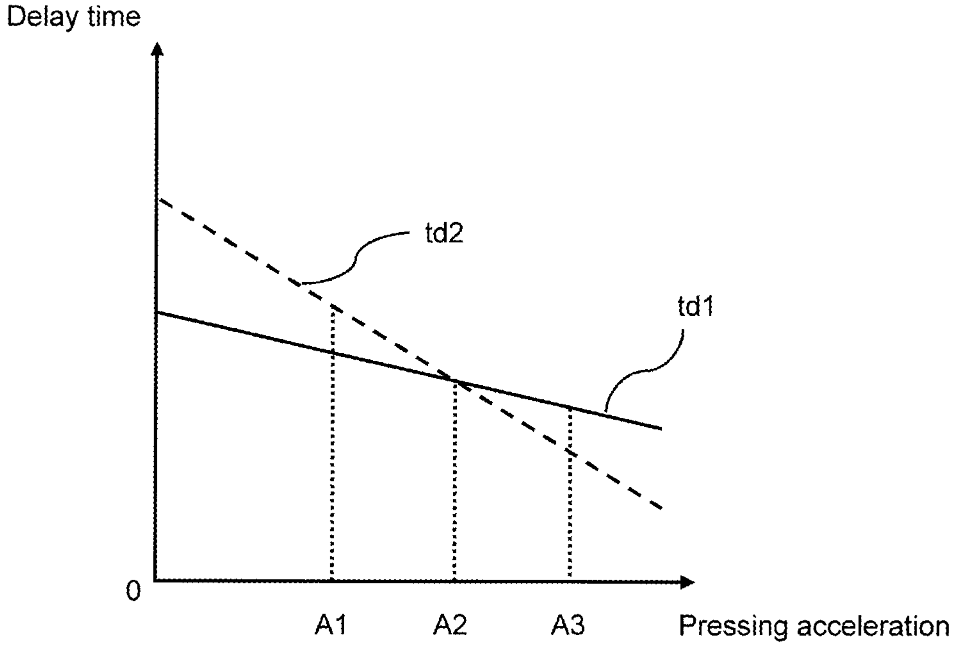
FIG. 5 is a diagram illustrating a string striking sound delay table and a collision sound delay table according to an embodiment of the present disclosure.

FIG. 5 is a diagram illustrating the string striking sound delay table and the collision sound delay table according to an embodiment of the present disclosure. Both tables specify the relationship between the pressing acceleration and the delay time. In FIG. 5, the string striking sound delay table is sown in contrast to the collision sound delay table. The string striking sound delay table specifies the relationship between the pressing acceleration and the string striking sound delay time td1. The collision sound delay table specifies the relationship between the pressing acceleration and the collision sound delay time td2. In either table, the greater the pressing acceleration, the shorter the delay time.

Here, when the pressing acceleration is A2, the string striking sound delay time td1 and the collision sound delay time td2 are equal. When the pressing acceleration is A1 smaller than A2, the collision sound delay time td2 is longer than the string striking sound delay time td1. On the other hand, when the pressing acceleration is A3 greater than A2, the collision sound delay time td2 is shorter than the string striking sound delay time td1. At this time, A2 may be "0". In this case, A1 is a negative value, which indicates that the speed is gradually decelerated during pressing. On the other hand, A3 is a positive value, which indicates that the speed is gradually accelerated during pressing.

In the example shown in FIG. 5, although the pressing acceleration and the delay time is defined by a relationship that can be represented by the linear function, it may be any relationship as long as the relationship such that the delay time can be specified based on the pressing acceleration. Other parameters may be used to specify the delay time rather than the pressing acceleration, or a plurality of parameters may be used together.

Figure 6:
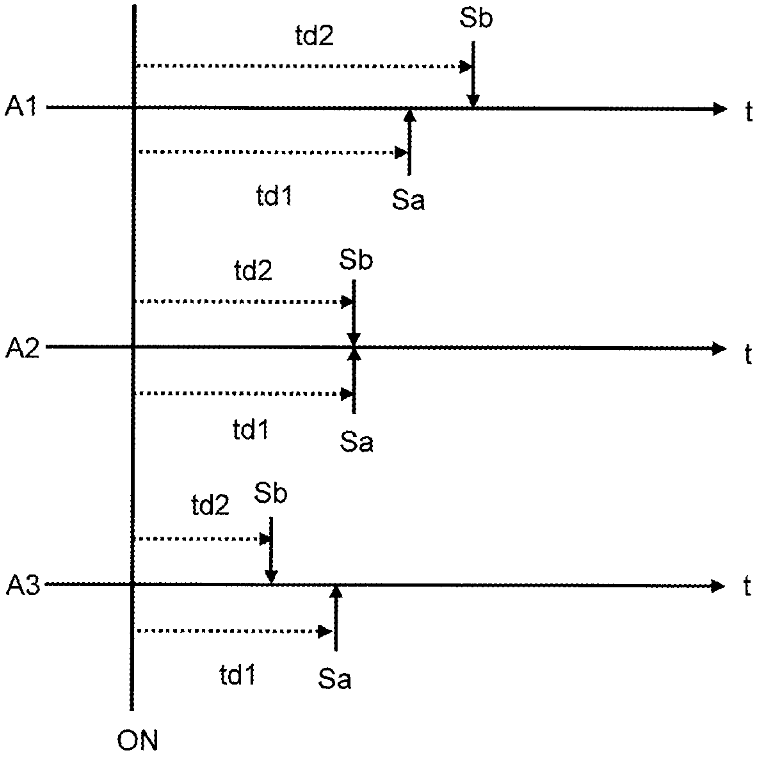
FIG. 6 is a diagram illustrating the timing of a string striking sound and a collision sound generation for note-on according to an embodiment of the present disclosure.

FIG. 6 is a diagram illustrating the timing of generating of the string striking sound and the collision sound with respect to the note-on according to an embodiment of the present disclosure. A1, A2, A3 in FIG. 6 correspond to the value of the pressing acceleration in FIG. 5. That is, the relationship of the pressing acceleration is A<1<2<3. The horizontal axis indicates the time. "ON" indicates the timing when the note-on signal Non is received. "Sa" indicates the timing at which the generation of the first sound signal (the string striking sound signal) is started, and "Sb" indicates the timing at which the generation of the second sound signal (the collision sound signal) is started. The string striking sound delay time td1 therefore corresponds to the time from "ON" to "Sa". The collision sound delay time td2 corresponds to the time from "ON" to "Sb".

As shown in FIG. 6, the greater the pressing acceleration, the less delay from the note-on in the timing of generating the first sound signal and the second sound signal. In addition, the rate of change in the generation timing due to the difference of the pressing acceleration is larger for the collision sound signal than for the string striking sound signal. Therefore, the relative relation between the generation timing of the string striking sound signal and the generation timing of the collision sound signal changes based on the pressing acceleration.

As described above, the delay adjustment unit 415 determines the string striking sound delay time td1 and the collision sound delay time td2 according to the pressing acceleration obtained from the acceleration calculation unit 407 referring to the string striking sound delay table and the collision sound delay table as described referring to FIG. 5. The delay adjustment unit 415 outputs the determined string striking sound delay time td1 and the collision sound delay time td2 to the signal generation unit 311.

The decay control unit 417 controls the envelopes of the first sound signal and the second sound signal generated in the signal generation unit 311 based on the second operation data input from the conversion unit 301 by referring to the first decay control table 309 and the second decay control table 310. In particular, the envelopes when the first sound signal and the second sound signal are decayed are controlled. In this example, the decay control unit 417 sets the parameters of the envelope based on the operation of the damper pedal 121, i.e., the second operation data and controls the decay speed.

The first decay control table 309 is a table that defines the relation between the velocity Vel and the decay coefficient k1 of the string striking sound according to the position of the damper pedal 121. Decay coefficient k1 is a coefficient showing the rate of change relative to the decay speed when the damper pedal is in the ON state. In this example, the decay coefficient k1 is a value of 1 or more. If k1=1, it means a decay speed that does not change from the setting value (decay rate DR). On the other hand, as k1 becomes larger than 1, the decay speed of the sound signal is increased.

Figure 7:
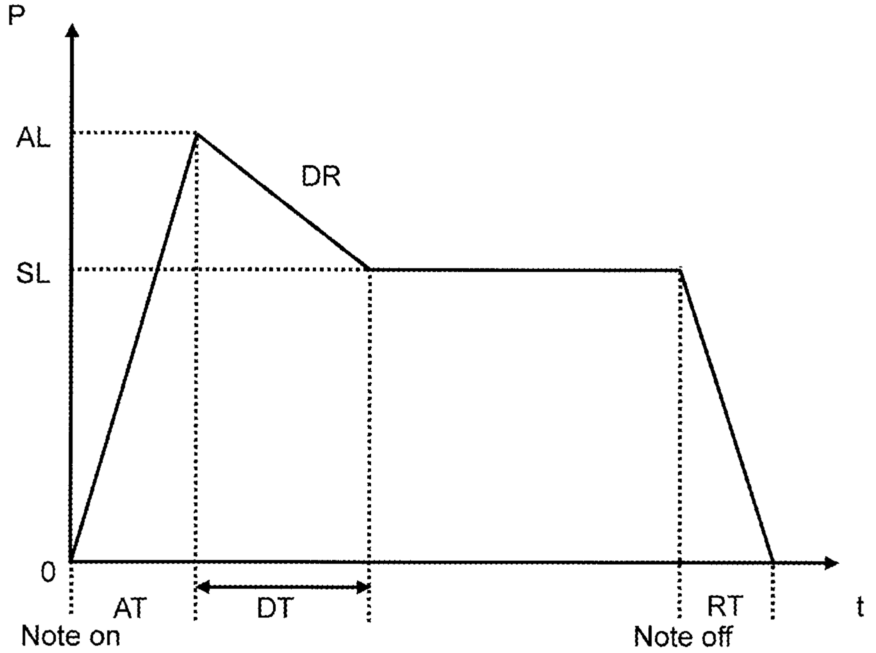
FIG. 7 is a diagram illustrating the definition of a general envelope waveform.

FIG. 7 is a diagram illustrating the definition of a general envelope waveform. As shown in FIG. 7, the envelope waveform is defined by a plurality of parameters. The plurality of parameters includes an attack level AL, an attack time AT, a decay time DT, a sustain level SL, and a release time RT. The attack level AL may be fixed to a maximum value, e.g., 127. In this case, the sustain level SL is set in the range of 0 to 127.

When the note-on is occurred, the envelope waveform rises to the attack level AL during the time of the attack time AT. Thereafter, the envelope waveform is decreased to the sustain level SL during the time of the decay time DT to maintain the sustain level SL. When the note-off is occurred, the envelope waveform decreases from the sustain level SL to the mute state (level "0") during the time of the release time RT. If the note-off is occurred before the envelope waveform reaches the sustain level SL, that is, a period during the attack time AT and the decay time DT, the envelope waveform reaches a mute state from that point to the release time RT. The mute state may be reached by the decay rate obtained by dividing the sustain level SL by the release time RT.

The decay rate DR is a value that can be calculated from the above-mentioned parameters, and is obtained by dividing the difference between the attack level AL and the sustain level SL by the decay time DT. This parameter (decay rate DR) indicates the degree of natural decay (decay speed) of the sound in the decay period after note-on. Although an example in which the decay speed of the decay rate DR in the decay period is constant (slope is a straight line) is shown, it may not necessarily be constant, the slope may be defined other than a straight line by making a predetermined change in the decay speed.

Figure 8:
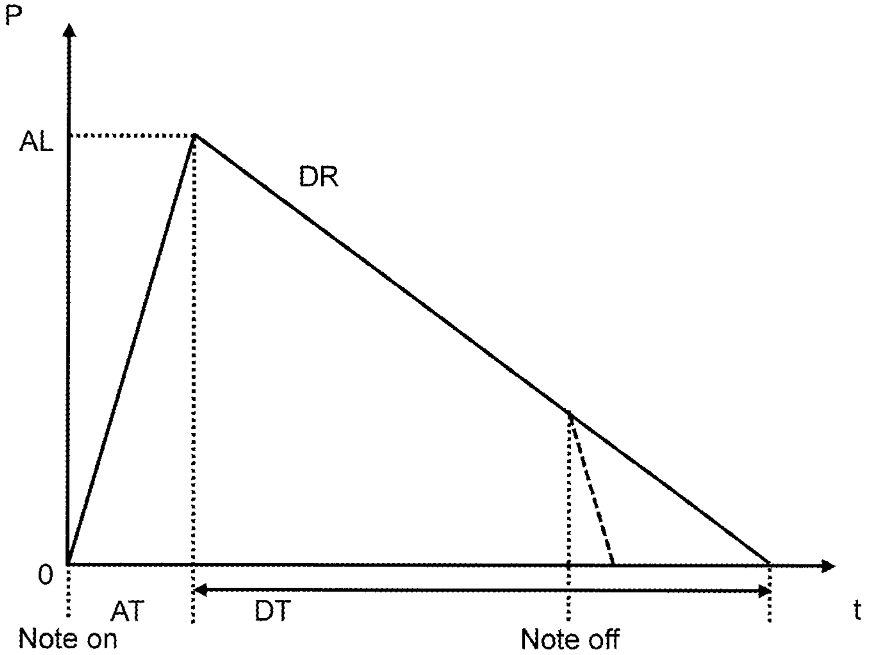
FIG. 8 is a diagram illustrating an exemplary envelope waveform for a string striking sound of a piano.

FIG. 8 is a diagram illustrating an exemplary envelope waveform of the string striking sound of a piano. A general piano sound is, for example, set the sustain level SL to "0" and the decay time DT is set relatively long (decay rate DR is small).

When a note-off is occurred during the decay time DT, the envelope waveform rapidly decreases as indicated by a dotted line in accordance with the setting of the release time RT. An EV waveform generation unit of the first sound signal generation unit 311-1 of the signal generation unit 311, which will be described later, generates the envelope waveform shown in FIG. 8. The decay rate DR is adjusted by the decay control unit 417. For example, the decay control unit 417 controls the decay rate DR (decay speed) slower when the damper pedal is on than when the damper pedal is off. The decay control unit 417 controls the decay rate DR (decay speed) faster when it is in the half pedal state than when the damper pedal is on, while controlling it slower than the decay speed when the damper pedal is off. Thus, the decay control unit 417 refers to the first decay control table 309 to set the parameters of the envelope of the first sound signal based on the second operation data and controls the decay speed of the first sound signal.

The second decay control table 310 is a table that defines the relationship between the velocity and decay coefficient k2 of collision sound according to the pitch. The decay coefficient k2 is a coefficient that indicates a ratio of changing of the decay speed according to the pitch. Here, when generating a sound in the middle range, the decay time is set to be longer than when generating a sound in the high range side and the low range side. When the decay speed of the second sound signal, that is, the collision sound, is assumed to be constant independent of the pitch, the second decay control table and the associated process can be omitted.

Figure 9:
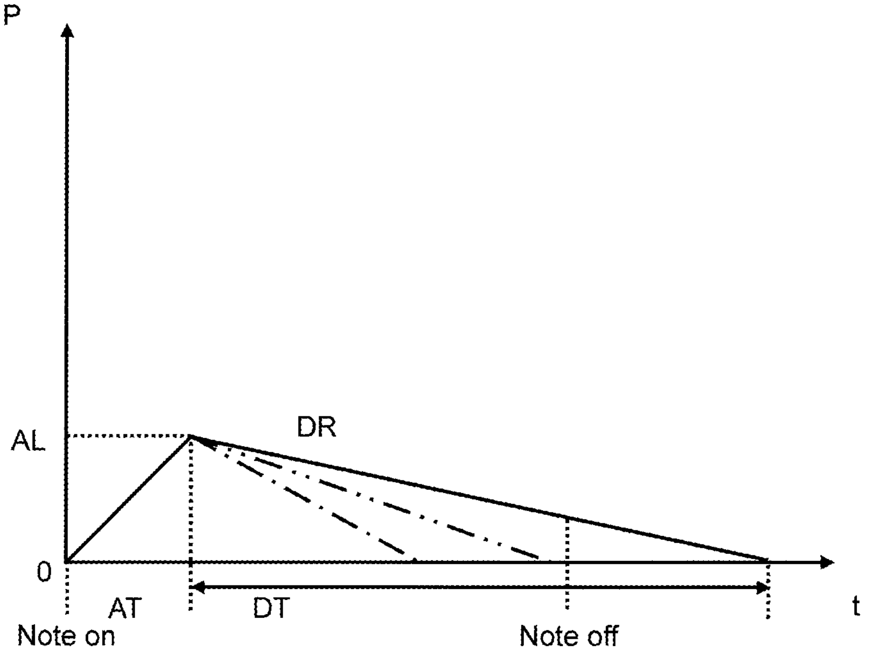
FIG. 9 is a diagram illustrating an exemplary envelope waveform of a collision sound of a piano.

FIG. 9 is a diagram illustrating an exemplary envelope waveform of collision sound of a piano. In collision sound of general pianos, for example, the sustain level SL is set to "0" and the decay time DT is set to be relatively long (the decay rate DR is relatively small). In the decay time DT, when note-off is occurred, collision sound decays according to the decay rate DR, unlike string striking sound. However, since the position at which the key hits the key bed changes in accordance with the pitch of the sounding, the decay time DT is set to be relatively short (the decay rate DR is set to be relatively large) in accordance with the pitch. For example, the characteristics shown by one-dot chain line and the two-dot chain line shown in FIG. 9 are selected in accordance with the pitch, and the decay time DT is set differently. The EV waveform generation unit of the second sound signal generation unit 311-2 of the signal generation unit 311, which will be described later, generates the envelope waveform as shown in FIG. 9.

Figure 10:
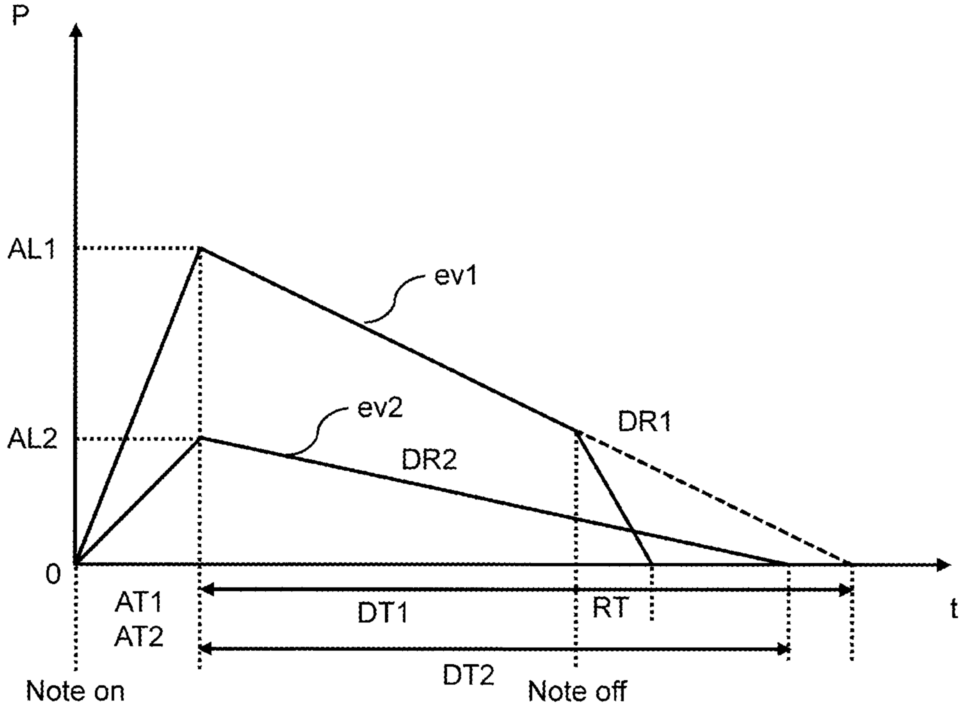
FIG. 10 is a diagram illustrating an exemplary envelope waveform of a string striking sound of a piano and an exemplary envelope waveform of a collision sound corresponding to the string striking sound.

As described above, when a note-off is occurred during the decay time DT, string striking sound rapidly decays according to the setting of the release time RT, whereas collision sound decays according to the decay rate DR, unlike string striking sound. FIG. 10 shows an exemplary envelope waveform of a string striking sound of a piano and an exemplary envelope waveform of a collision sound corresponding to the string striking sound. In FIG. 10, ev1 is an exemplary envelope waveform of string striking sound and ev2 is an exemplary envelope waveform of collision sound corresponding to ev1. As shown in FIG. 10, when a note-off is occurred during the decay time DT1, string striking sound rapidly decays according to the setting of the release time RT. On the other hand, collision sound decays according to the decay rate DR2 even if a note-off is occurred during the decay time DT2. The attack time AT1 of string striking sound and the attack time AT2 of collision sound may be different from each other depending on the pressing acceleration.

As described above, the adjustment unit 313 refers to the first decay control table 309 and the second decay control table 310, sets the parameters of the envelopes of the first sound signal and the second sound signal based on the second operation data input from the conversion unit 301, and controls the decay speed of the signal based on the respective waveform data output from the waveform data memory unit 305. The adjustment unit 313 adjusts the relationship between the timing and the volume of sounding of the first sound signal and the second sound signal generated in the signal generation unit 311 based on the first operation data.

Figure 11:
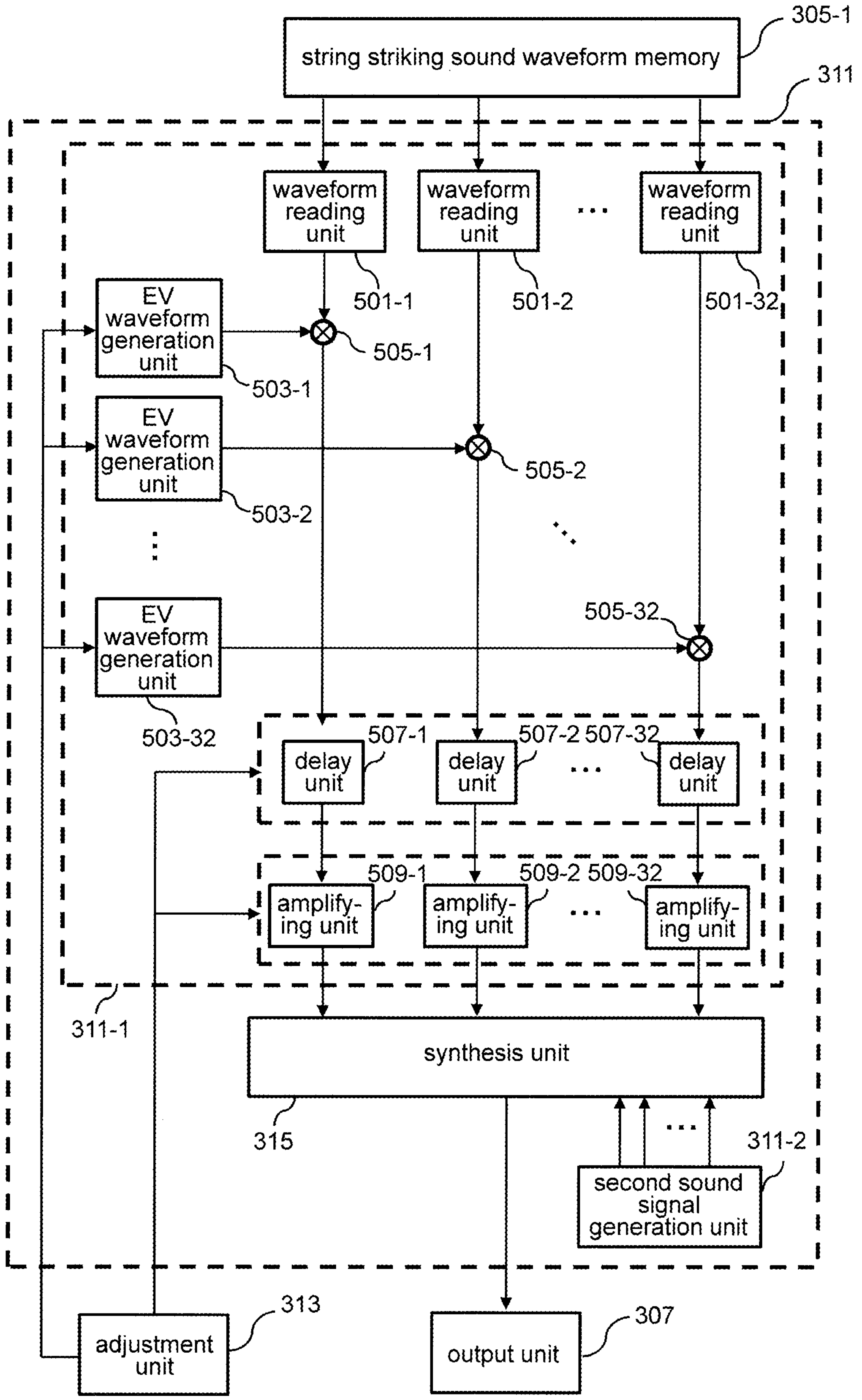
FIG. 11 is a block diagram showing an exemplary functional configuration of a first sound signal generation unit in a signal generation unit according to an embodiment of the present disclosure.

FIG. 11 is a block diagram showing an exemplary functional configuration of the first sound signal generation unit 311-1 in the signal generation unit 311 according to the present embodiment. The first sound signal generation unit 311-1 includes a waveform reading unit 501 (501-*k*; k=1~n), an EV (envelope) waveform generation unit 503 (503-*k*; k=1~n), a multiplier 505 (505-*k*; k=1~n), a delay unit 507 (507-*k*; k=1~n), and an amplifying unit 509 (509-*k*; k=1~n). Here, "n" corresponds to the number that the keyboard instrument 100 can sound simultaneously (the number of sound signals that can be generated by the signal generation unit 311 at the same time), in this example, n is 32. Therefore, in the first sound signal generation unit 311-1, the state in which the key is sounded up to 32 times is maintained, and when the 33rd depression is occurred while all are sounded, the sound signal corresponding to the first sound is forcibly stopped.

The waveform reading unit 501 selects and reads out the string striking sound waveform data to be read out from the string striking sound waveform memory 305-1 based on the first operation data (e.g., the note-on signal Non, the note number Note, and the velocity Vel) obtained from the control signal generation unit 401 of the conversion unit 301, and generates a sound signal (the first sound signal) of a pitch corresponding to the note number Note. The waveform reading unit 501 continues to read the string striking sound waveform data until the generated sound signal is silenced in response to the note-off signal Noff.

The EV waveform generation unit 503 generates an envelope waveform based on the first operation data obtained from the control signal generation unit 401 of the conversion unit 301 and the parameters set in the decay control unit 417 of the adjustment unit 313 described above. For example, the envelope waveform is defined by parameters of the attack level AL, the attack time AT, the decay time DT, the sustain level SL, and the release time RT.

The multiplier 505 multiplies the first sound signal generated in the waveform reading unit 501 by the envelope waveform generated in the EV waveform generation unit 503, and outputs it to the delay unit 507.

The delay unit 507 delays the first sound signal according to the set delay time and outputs the delayed first sound signal to the amplifying unit 509. The delay time is set based on the string striking sound delay time td1 determined in the delay adjustment unit 415 of the adjustment unit 313.

The amplifying unit 509 amplifies the first sound signal in accordance with the set amplification factor and outputs the amplified first sound signal to the synthesis unit 315. This amplification factor is set based on string striking volume specified value determined by the string striking volume adjustment unit 411 of the adjustment unit 313 described above and is generated so that the output level (volume) becomes larger as the key press speed calculated in response to the depressing of the key 101 becomes higher.

In the above, the case when k=1 (k=1~n) is exemplified by referring to FIG. 11, the control signal obtained from the control signal generation unit 401 is applied in the order of k=2, 3, 4 . . . each time the next key is pressed when the string striking sound waveform data is read from the waveform reading unit 501-1. For example, if the next key depression, the control signal is applied to the configuration of k=2, the sound signal is output from the multiplier 505-2 in the same manner as described above. This sound signal is delayed by the delay unit 507-2, amplified by the amplifying unit 509-2, and output to the synthesis unit 315.

Figure 12:
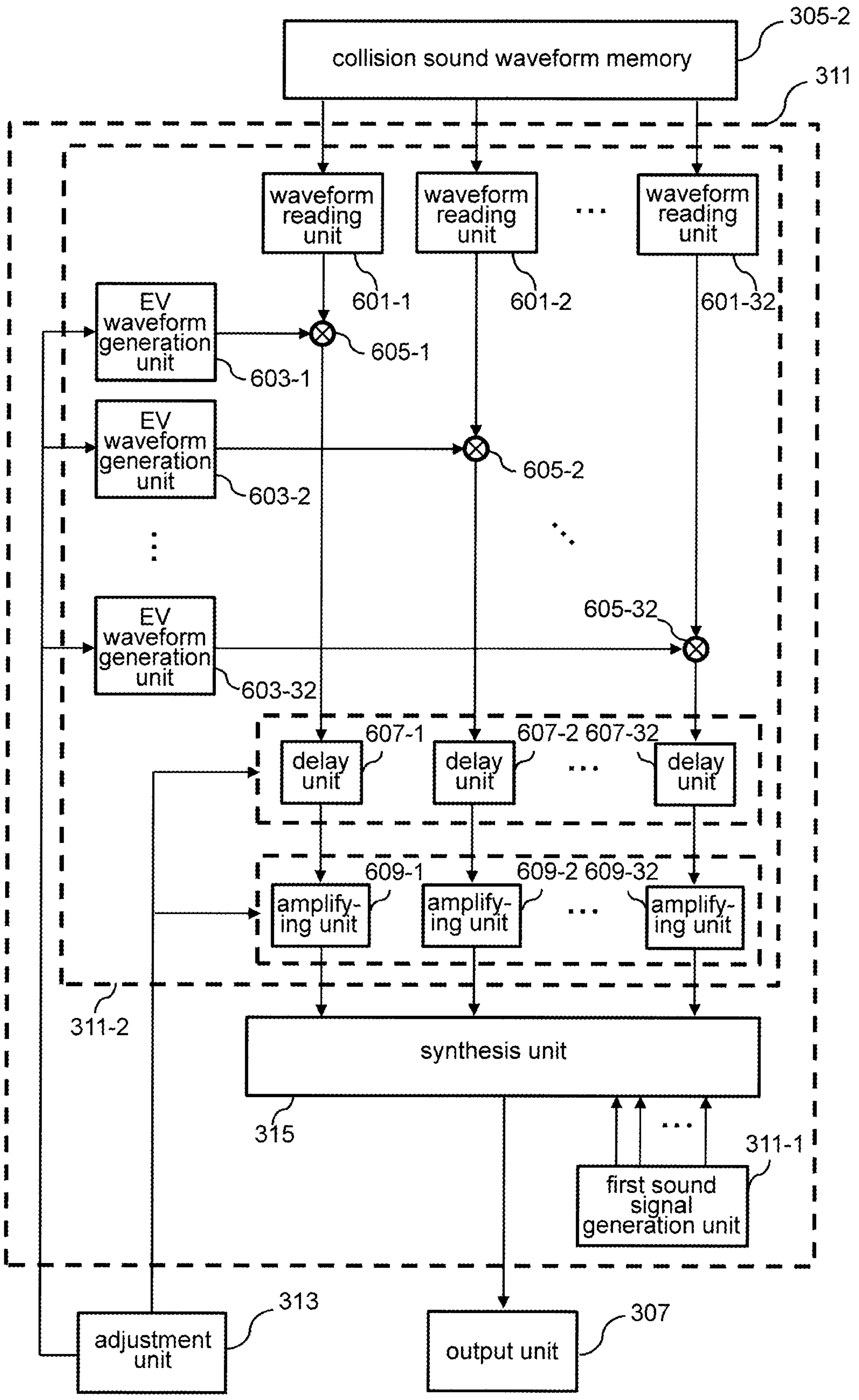
FIG. 12 is a block diagram showing an exemplary functional configuration of a second sound generation unit in a signal generation unit according to an embodiment of the present disclosure.

FIG. 12 is a block diagram showing an exemplary functional configuration of the second sound signal generation unit 311-2 in the signal generation unit 311 according to the present embodiment. The second sound signal generation unit 311-2 includes a waveform reading unit 601 (601-*j*; j=1~m), an EV (envelope) waveform generation unit 603 (503-*j*; j=1~m), a multiplier 605 (605-*j*; k=1~m), a delay unit 607 (607-*j*; j=1~m), and an amplifying unit 609 (609-*j*; k=1~m). Here, "m" corresponds to the number that the keyboard instrument 100 can sound at the same time (the number of sound signals that the signal generation unit 311 can generate at the same time), in this example, m is 32. Therefore, in the second sound signal generation unit 311-2, the state in which the key is sounded up to 32 times is maintained, and when the 33rd depression is occurred while all are sounded, the sound signal corresponding to the first sound is forcibly stopped. In most cases, "m" may be less than "n" ("m<n"), since the reading of collision sound waveform data ends in less time than the reading of string striking sound waveform data.

The waveform reading unit 601 selects and reads collision sound waveform data to be read from the collision sound waveform memory 305-2 based on the first operation data obtained from the control signal generation unit 401 of the conversion unit 301 (e.g., the note-on signal Non, the velocity Vel), and generates a sound signal (second sound signal) corresponding to the first operation.

The EV waveform generation unit 603 generates an envelope waveform based on the first operation data (e.g., the note number Note) obtained from the control signal generation unit 401 of the conversion unit 301 and the parameters set in the decay control unit 417 of the adjustment unit 313 described above. For example, the envelope waveform is defined by parameters of the attack level AL, the attack time AT, the decay time DT, the sustain level SL, and the release time RT.

The multiplier 605 multiplies the second sound signal generated in the waveform reading unit 601 by the envelope waveform generated in the EV waveform generation unit 603, and outputs it to the delay unit 607.

The delay unit 607 delays the second sound signal according to the set delay time and outputs the delayed second sound signal to the amplifying unit 609. The delay time is set based on the collision sound delay time td2 determined in the delay adjustment unit 415 of the adjustment unit 313.

The amplifying unit 609 amplifies the second sound signal in accordance with the set amplification factor and outputs the amplified second sound signal to the synthesis unit 315. This amplification factor is set based on the collision volume specified value determined in the collision volume adjustment unit 413 of the adjustment unit 313 described above and is generated so that the output level (volume) becomes larger as the calculated collision speed in response to the depressing of the key 101 becomes higher.

Above, the case when j=1 (j=1~m) is exemplified by referring to FIG. 12, the control signal obtained from the control signal generation unit 401 is applied in the order j=2, 3, 4 . . . each time the next key is pressed when the collision sound waveform data is read from the waveform reading unit 601-1. For example, if the next key depression, the control signal is applied to the configuration of j=2, and the sound signal is output from the multiplier 605-2 in the same manner as described above. This sound signal is delayed by the delay unit 607-2, amplified by the amplifying unit 609-2, and output to the synthesis unit 315.

The synthesis unit 315 syntheses the first sound signal (the string striking sound signal) output from the first sound signal generation unit 311-1 and the second sound signal (the collision sound signal) output from the second sound signal generation unit 311-2 and outputs it to the output unit 307. The configuration of the sound generator 115 has been described above.

As described above, the decay control unit 417 of the adjustment unit 313 sets the parameters of the envelope of the second sound signal to be constant independent of the second operation data, that is, the operation of the damper pedal 121. Therefore, the decay control unit 417 may omit the control of the envelope of the second sound signal. In this case, in the second sound signal generation unit 311-2, the EV waveform generation unit 603 may be omitted, and the second sound signal generated based on the collision sound waveform data read by the waveform reading unit 601 may be directly output to the delay unit 607 without envelope control.

In the keyboard instrument 100 according to the first embodiment of the present disclosure, the adjustment unit 313 of the sound generator 115 controls the envelopes for the first sound signal and the second sound signal differently based on the second operation data corresponding to the operation of the damper pedal 121. That is, the parameters of the envelope of the first sound signal are set based on the second operation data. On the other hand, the parameters of the envelope of the second sound signal are fixed regardless of the data of the second operation. This makes it possible to reproduce a sound similar to the acoustic piano.

Subsequently, the sound generation control of the first sound signal (the string striking sound) and the second sound signal (the collision sound) implemented by the control unit 111 will be described.

Figure 13:
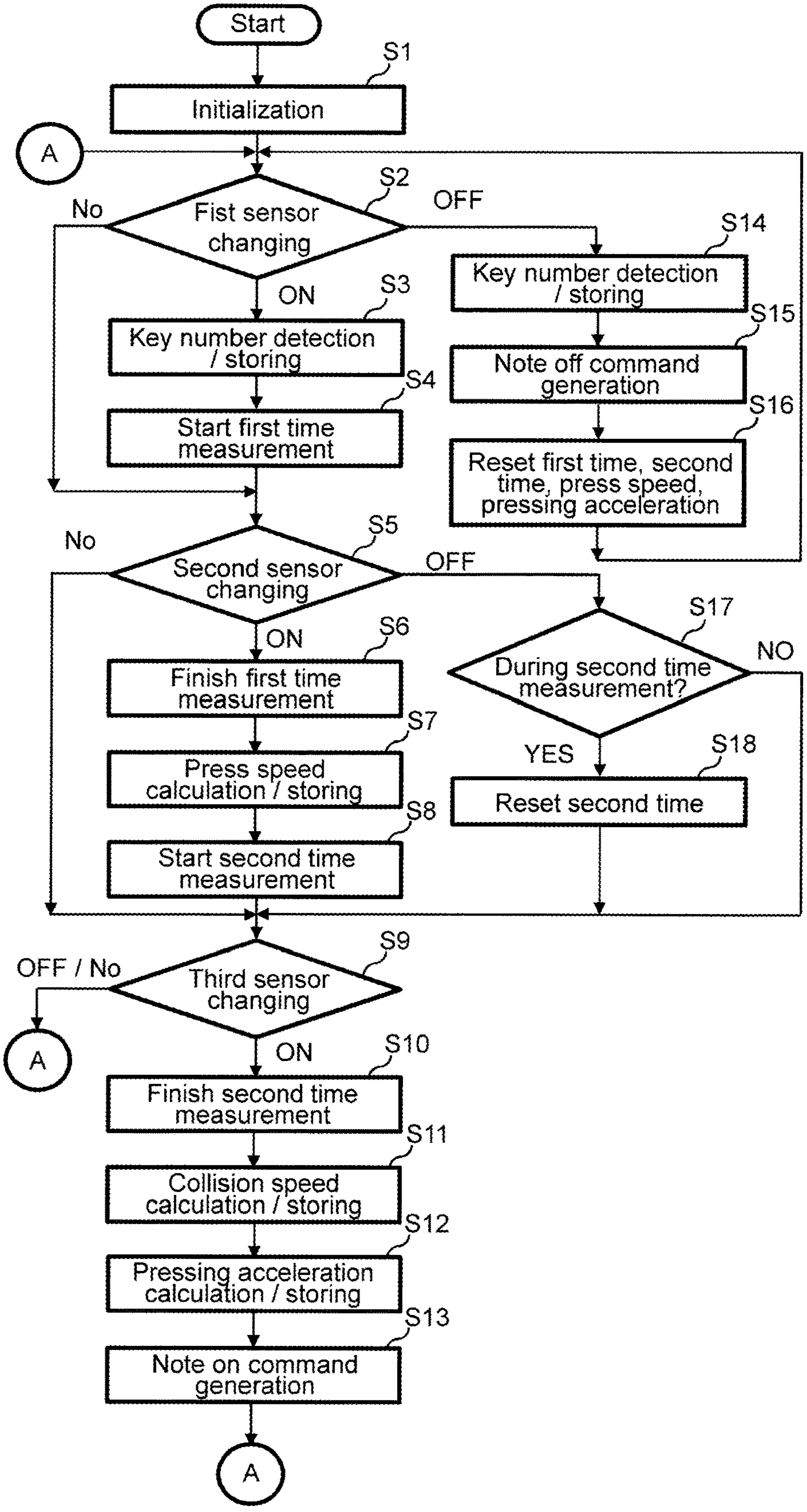
FIG. 13 is a flow chart illustrating a first process implemented by a control unit according to an embodiment of the present disclosure.
Figure 14:
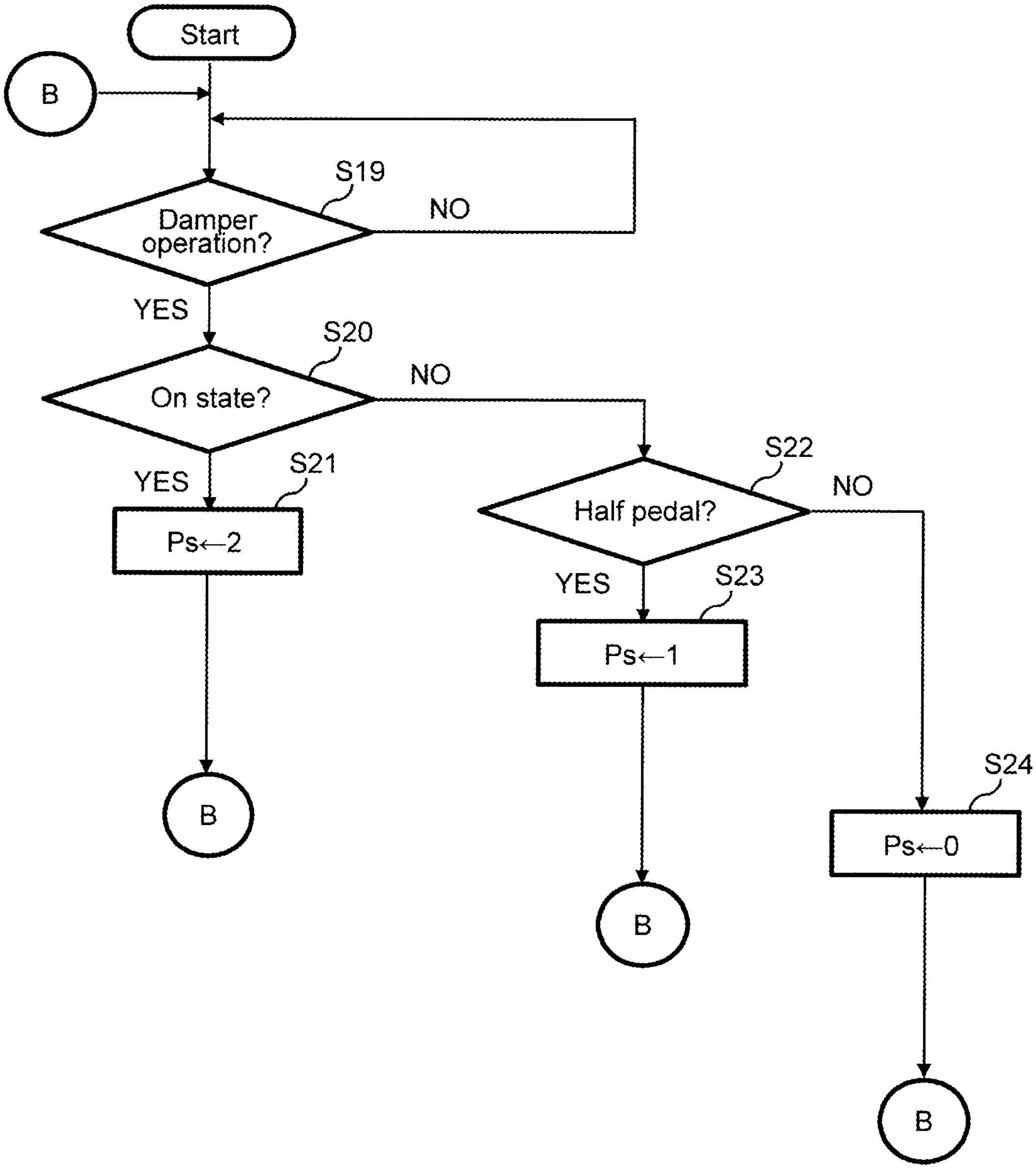
FIG. 14 is a flow chart illustrating a second process implemented by a control unit according to an embodiment of the present disclosure.

FIG. 13 is a flow chart illustrating a first process implemented by the control unit 111 according to an embodiment of the present disclosure. This process is implemented in response to each key. FIG. 14 is a flow chart illustrating a second process implemented by the control unit 111 according to an embodiment of the present disclosure. This processing is implemented in response to the operation of the damper pedal.

First, the first process implemented by the control unit 111 will be described. The control unit 111 resets various registers and flags stored in the memory device such as RAM and initializes such as setting an initial value (S1). In this S1, the control unit 111 instructs the sound generator 115 to initialize various registers and flags. Subsequently, the control unit 111 determines whether or not on/off state of the first sensor 117-1 (FIG. 2) has changed due to the key pressing operation and whether or not it has been turned on or off when there is a change (S2). When the on/off state of the first sensor 117-1 has not changed (S2; NO), the process proceeds to S5. When it is determined that the first sensor 117-1 is turned on from off (S2; ON), the control unit 111 detects the key number of the key corresponding to the first sensor 117-1 that is turned on and stores the detected key number in the register (S3). Subsequently, the control unit 111 starts the measurement of the first time required for the second sensor 117-2 to be turned on after the first sensor 117-1 is turned on (S4).

Next, the control unit 111 determines whether or not the on/off state of the second sensor 117-2 has changed, and whether or not the on/off state has been turned on or off when there has been a change (S5). When the on/off state of the second sensor 117-2 has not changed (S5; NO), the process proceeds to S9. When the control unit 111 determines that the second sensor 117-2 is turned on from off (S5; ON), the control unit 111 terminates the measurement of the first time (S6). Subsequently, the control unit 111 calculates the key press speed based on the measured first time and stores the calculated key press speed in the register (S7). The key press speed may be a value corresponding to the speed obtained by the calculation as shown here and is not limited to the case where it coincides with the actual speed.

Subsequently, the control unit 111 starts the measurement of the second time required for the third sensor 117-3 to be turned on after the second sensor 117-2 is turned on (S8). Next, the control unit 111 determines whether or not the on/off state of the third sensor 117-3 has changed, and whether or not the on/off state has been turned on or off when there has been a change (S9). If the on/off state of the third sensor 117-3 has not changed (S9; NO) or turned off (S9; OFF), the control unit 111 returns the process to S2. When it is determined that the third sensor 117-3 is turned on from off (S9; ON), the control unit 111 terminates the measurement of the second time (S10).

After measuring the second time, the control unit 111 calculates the collision speed based on the first time and the second time and stores the calculated collision speed in the register (S11). The collision speed may be a value corresponding to the velocity obtained by the calculation as shown here and is not limited to the case where it coincides with the actual velocity. Subsequently, the control unit 111 calculates the pressing acceleration based on the measured time difference Δt between the first time and the second time and stores the calculated pressing acceleration in the register (S12). Calculation of the pressing acceleration may be implemented using a table associated with the time difference Δt between the first time and the second time and the pressing acceleration. The pressing acceleration may be a value corresponding to the acceleration obtained by a predetermined calculation as shown here and is not limited to the case where it coincides with the actual acceleration.

The control unit 111 generates a note-on command (S13) having the key number stored in the register in S3, the key press speed stored in the register in S7, the collision speed stored in the register in S11, and the pressing acceleration stored in the register in S12.

When the control unit 111 determines in S2 that the first sensor 117-1 has changed from on to off (S2; OFF), the control unit 111 detects the key number of the key corresponding to the first sensor 117-1 that has turned off and stores the detected key number in the register (S14). The control unit 111 generates a note-off command having the key number stored in the register (S15), and resets the first time, the second time, the key press speed, and the pressing acceleration of the corresponding key (S16).

When the control unit 111 determines in S5 that the second sensor 117-2 has changed from on to off (S5; OFF), if the second time is not being measured (S17, NO), the control unit 111 proceeds the process to S9, and if the second time is being measured (S17, YES), the control unit 111 resets the second time of the corresponding key (S18) and proceeds the process to S9.

Next, the second process implemented by the control unit 111 will be described. The control unit 111 determines whether or not the damper pedal 121 is operated (S19). When the damper pedal 121 is not operated, the process returns to S19. When the damper pedal 121 is operated (S19; YES), the control unit 111 determines whether or not the damper pedal 121 is in the ON state based on the pushing amount of the damper pedal 121 (S20). If it is ON state (S20; Yes), the control unit 111 sets pedal state flag Ps indicating the ON state to 2 (S21).

If it is not on state (S20; NO), the control unit 111 determines whether the dumper pedal 121 is the half pedal (the dumper pedal 121 is in an intermediate position excluding the rest position and the end position) based on the pushing amount of the dumper pedal 121 (S22). If it was the half pedal (S22; YES), the control unit 111 sets the pedal state flag Ps indicating that it is in the half pedal state to 1 (S23). If it is not the half pedal (S22; NO), the control unit 111 determines that the damper pedal 121 is in the off state and sets the damper pedal state flag Ps indicating that it is in the off state to 0. (S24).

Thus, the control unit 111 generates a first instruction signal (the first operation data) such as the note-on command and the note-off command based on the detection result by the first detection unit 117 (the first sensor 117-1, the second sensor 117-2 and the third sensor 117-3). The control unit 111, based on the detection result by the second detection unit 125, also generates a second instruction signal (the second operation data) indicating the state of the damper pedal.

Figure 15:
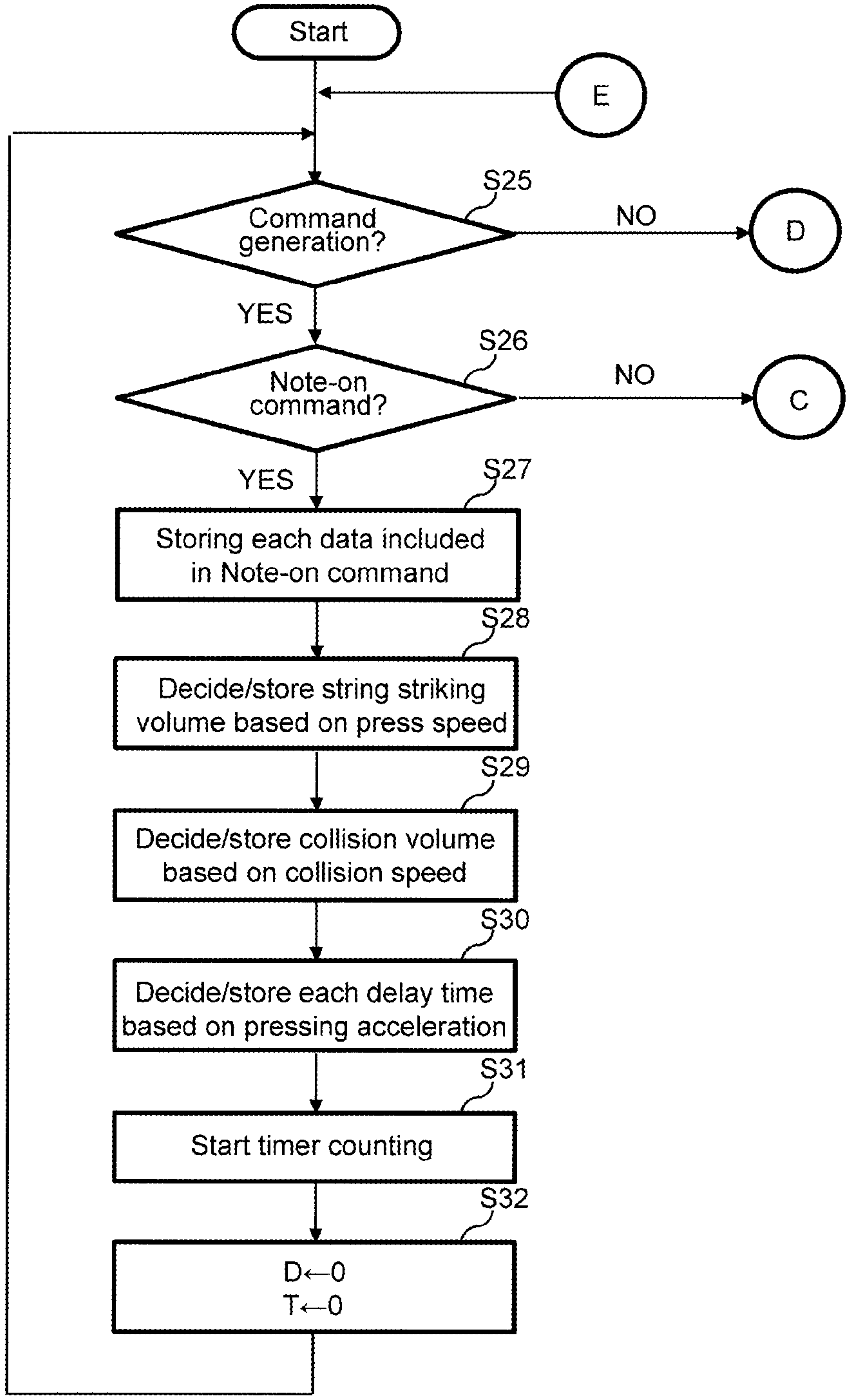
FIG. 15 is a flow chart showing a process in a sound signal generation unit according to an embodiment of the present disclosure.
Figure 16:
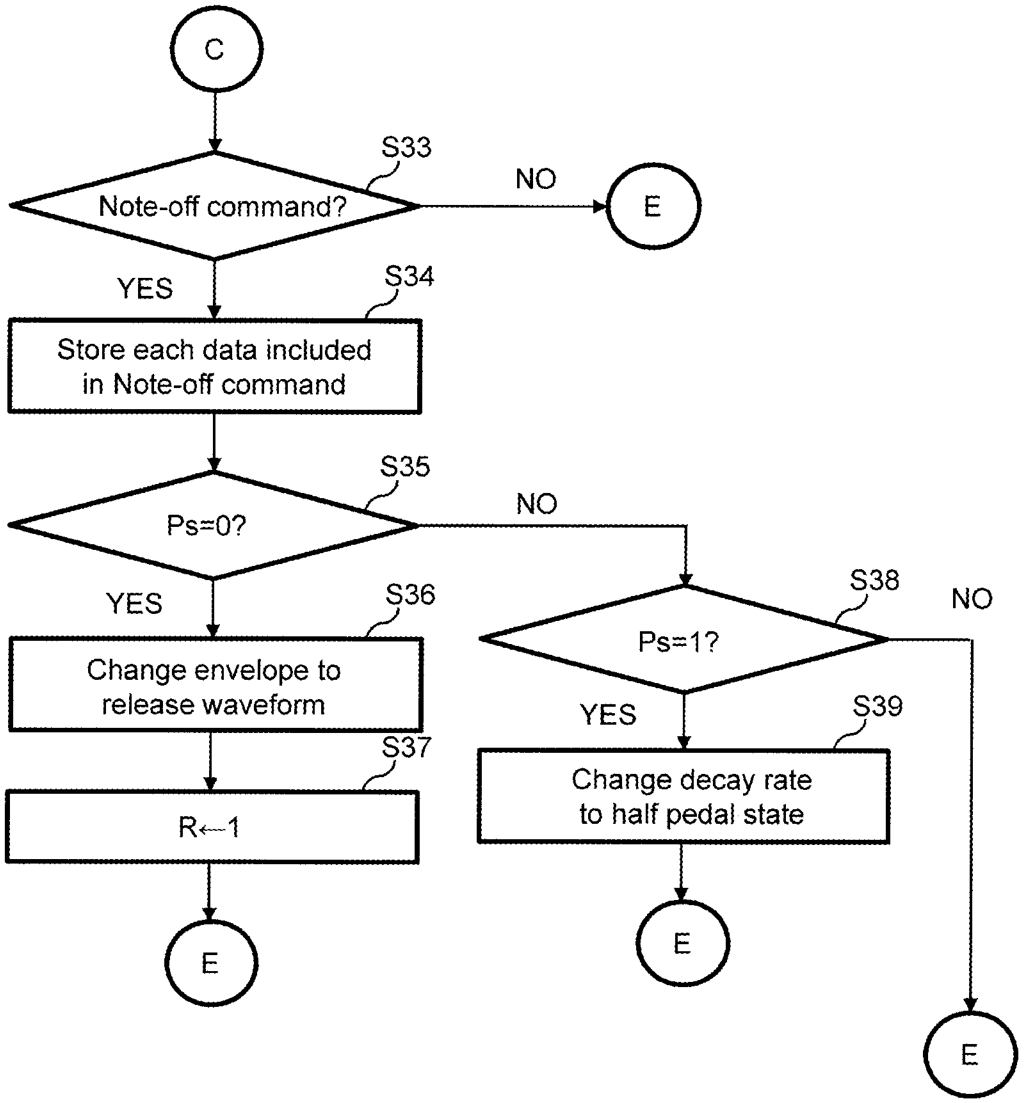
FIG. 16 is a flow chart showing a process in a sound signal generation unit according to an embodiment of the present disclosure.
Figure 17:
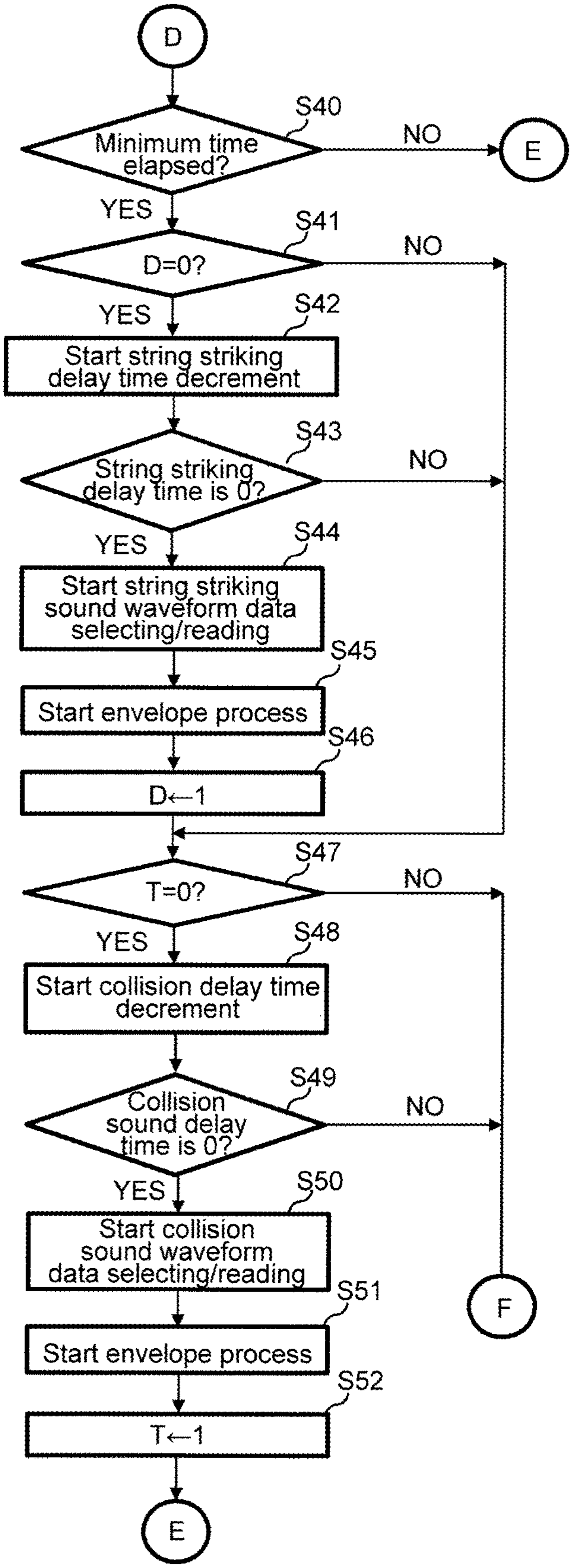
FIG. 17 is a flow chart showing a process in a sound signal generation unit according to an embodiment of the present disclosure.
Figure 18:
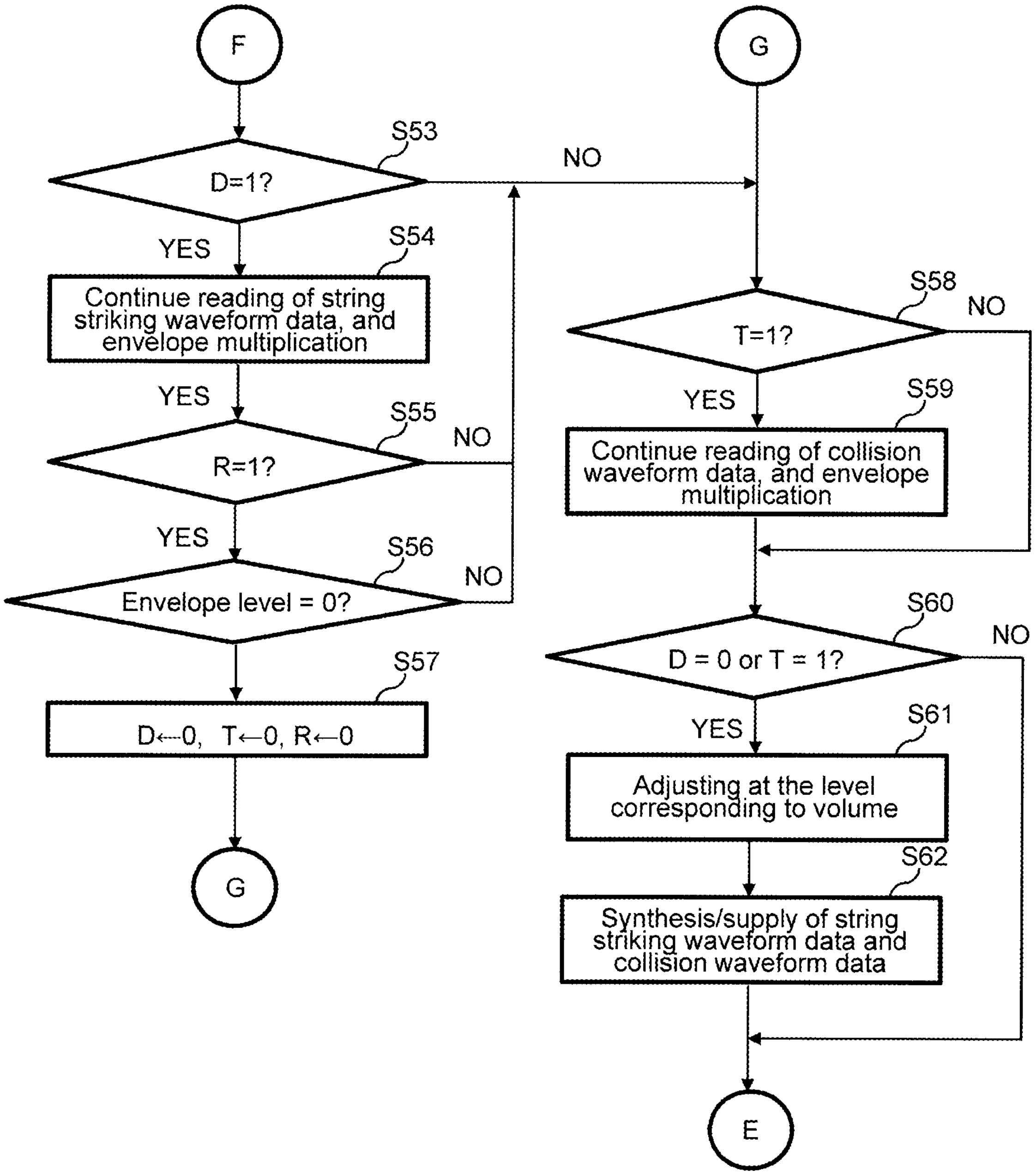
FIG. 18 is a flow chart showing a process in a sound signal generation unit according to an embodiment of the present disclosure.

FIG. 15 is a flow chart showing a process in the sound signal generation unit 303 according to an embodiment of the present disclosure. FIGS. 16 to 18 are flowcharts showing the continuation of the process shown in FIG. 15. These processes are implemented for each key.

The sound signal generation unit 303 determines whether or not a command has been generated (S25), and if it is determined that a command has been generated (S25; YES), the sound signal generation unit 303 determines whether or not the command is a note-on command (S26). Here, when it is determined that the command is a note-on command (S26: Yes), the sound signal generation unit 303 stores the data included in the note-on command, that is, the key number, the key press speed, the collision speed, and the pressing acceleration in the register (S27).

Subsequently, the sound signal generation unit 303 determines the string striking volume specified value based on the key press speed stored in the register and stores the determined value in the register (S28). Next, the sound signal generation unit 303 determines the collision volume specified value based on the collision speed and stores the collision volume specified value in the register (S29). Subsequently, the sound signal generation unit 303 determines the string striking sound delay time td1 and the collision sound delay time td2 based on the pressing acceleration and stores them in the register (S30).

Subsequently, the sound signal generation unit 303 starts counting a timer in order to measure elapsed time for obtaining timings corresponding to the string striking sound delay time td1 and the collision sound delay time td2 (S31). The sound signal generation unit 303 resets read state flag D indicating that the string striking sound waveform data is being read from the string striking sound waveform memory 305-1 (FIG. 3) and read state flag T indicating that the collision sound waveform data is being read from the collision sound waveform memory 305-2 (FIG. 3) to 0 (S32), respectively, and returns the process to S25.

When the sound signal generation unit 303 determines in S26 that the generated command is not a note-on command (S26; NO), the sound signal generation unit 303 determines whether or not the generated command is a note-off command (S33). When it is determined that the generated command is not the note-off command (S33; NO), the signal generation unit 303 returns the process to S25. When it is determined that the generated command is the note-off command (S33; YES), the sound signal generation unit 303 stores data such as the key number included in the note-off command in the register (S34). Subsequently, the sound signal generation unit 303 determines whether or not the damper pedal state flag Ps is 0 (S35), and if Ps is 0 (S35; YES), the sound signal generation unit 303 changes the envelope to be multiplied by the string striking sound waveform data being generated to a release waveform (S36), and sets the release state flag R indicating the key release state to 1 (S37). If it is not Ps0 (S35; NO), the sound signal generation unit 303 determines whether or not the damper pedal state flag Ps is 1 (S38). If Ps is 1 (S38; YES), the sound signal generation unit 303 changes the decay rate DR of the envelope to be multiplied by the string striking sound waveform data being generated to the half pedal state (S39). If Ps is not 1 (S38; NO), that is, if the damper pedal state flag Ps is 2, the sound signal generation unit 303 returns the process to S25.

When it is determined that no commands have been generated in the subsequent process cycles (S25; NO), the sound signal generation unit 303 determines whether or not the minimum unit time has elapsed (S40 in FIG. 17), and when the minimum unit time has not elapsed (S40; NO), the sound signal generation unit 303 returns the process to S25. Here, the minimum unit time is a time corresponding to one cycle of the timer clock counted by the timer that has started counting in S31.

Subsequently, when it is determined that the minimum unit time has elapsed (S40; YES), the sound signal generation unit 303 determines whether or not the read state flag D is 0 (S41). When it is determined that the read state flag D is 0 (S41; YES), the sound signal generation unit 303 starts decrementing of the string striking sound delay time td1 to determine the generation timing of the string striking sound (S42). Subsequently, the sound signal generation unit 303 determines whether or not the string striking sound delay time td1 has reached 0, that is, whether or not the sound generation timing has been reached (S43). When the sound signal generation unit 303 determines that the string striking sound delay td1 is not 0 (S43; NO), the process proceeds to S47. When the string striking sound delay time td1 is determined to 0 (S43; YES), the sound signal generation unit 303 refers to the string striking sound waveform memory 305-1 (FIG. 3), selects the string striking sound waveform data corresponding to the key number stored in the register, and starts its readout (S44). Subsequently, the sound signal generation unit 303 starts an envelope process of multiplying the read string striking sound waveform data by the envelope waveform (S45). Known ADSR (Attack, Decay, Sustain, Release) control is applied to the envelope process.

Subsequently, the sound signal generation unit 303 sets the read state flag D to 1 (S46), and determines whether or not the read state flag T is 0 (S47). When it is determined that the read state flag T is 0 (S47: YES), the sound signal generation unit 303 starts decrementing of the collision sound delay time td2 for determining the generation timing of the collision sound (S48). Subsequently, the sound signal generation unit 303 determines whether or not the collision sound delay time td2 has reached 0, that is, whether or not the sound generation timing has been reached (S49). When the sound signal generation unit 303 determines that the collision sound delay time td2 is not 0 (S49; NO), the process proceeds to S53. When the sound signal generation unit 303 determines that the collision sound delay time td2 is 0 (S49; YES), the sound signal generation unit 303 refers to the collision sound waveform memory 305-2 (FIG. 3), selects the collision sound waveform data corresponding to the key number stored in the register, and starts its reading (S50). Subsequently, the sound signal generation unit 303 starts the envelope process of multiplying the read collision sound waveform data by the envelope waveform (S51). Next, the sound signal generation unit 303 sets the read state flag T to 1 (S52).

Subsequently, the sound signal generation unit 303 returns the process to S25 (FIG. 15), and if it is determined that the command has not been generated (S25; NO), the sound signal generation unit 303 proceeds the process to S40 (FIG. 17). When it is determined that the minimum time has elapsed (S40; YES), the sound signal generation unit 303 determines that the read state flag D has not been reset to 0 (S41; NO) because the read state flag D has been set to 1 in the preceding S46 and proceeds the process to S47. Subsequently, since the read state flag T has been set to 1 in the preceding S52, the sound signal generation unit 303 determines that the read state flag T has not been reset to 0 (S47; NO) and proceeds the process to S53 (FIG. 18). Here, the sound signal generation unit 303 determines whether or not the read state flag D is set to 1 (S53), and if it is determined that the read state flag D is not 1 (S53; NO), the sound signal generation unit 303 proceeds the process to S58. When it is determined that the read status flag D is 1 (S53; YES), the sound signal generation unit 303 continues the reading of the string striking sound waveform data that has started to be read in the previous S44 and the process of multiplying the string striking sound waveform data by the envelope (S54).

Subsequently, the sound signal generation unit 303 determines whether or not the release state flag R is set to 1, that is, whether or not the key is released (S55), and if it is determined that the release state flag R is not 1 (S55; NO), the sound signal generation unit 303 determines whether or not the read state flag T is set to 1 (S58). If the sound signal generation unit 303 determines that the read state flag T is not 1 (S58; NO), the sound signal generation unit 303 proceeds the process to S60. When it is determined that the read state flag T is 1 (S58: YES), the sound signal generation unit 303 continues to read the collision sound waveform data (S59).

Subsequently, the sound signal generation unit 303 determines whether or not the read state flag D or the read state flag T is set to 1, that is, whether or not at least one of the string striking sound waveform data and the collision sound waveform data is being read (S60). When it is determined that the read state flags D and T are not 1 (both are 0) (S60; NO), the sound signal generation unit 303 returns the process to S25 of FIG. 15. When it is determined that the read-out state flag D or T is 1 (S60: YES), the sound signal generation unit 303 adjusts the level of the string striking sound waveform data and the collision sound waveform data read out at the present time to a level according to the string striking volume and the collision volume based on the string striking volume specified value and the collision volume specified value (S61).

Subsequently, the sound signal generation unit 303 supplies the waveform data obtained by synthesizing the adjusted string striking sound waveform data and the adjusted collision sound waveform data in S61 to the output unit 307 (FIG. 3) (S62), and the process returns to S25 (FIG. 15). The generation timings of the string striking sound and the collision sound contained in the synthetic waveform data generated in S62 are adjusted according to the string striking sound delay time td1 and the collision sound delay time td2, and their output levels are adjusted based on the string striking volume specified value and the collision volume specified value. When one of the waveform data is not read, the waveform data is not substantially synthesized, and the read waveform data is output.

In the determination process of S55 (FIG. 18), in a state in which the release state flag R is set to 1 (in S37 of FIG. 16, the release state flag R indicating the key release state is set to 1), the sound signal generation unit 303 determines that the release state flag R is 1, that is, it is determined that the key is released (S55; YES). In this case, the sound signal generation unit 303 determines whether or not the envelope level has become 0 (S56), and if it is determined that the envelope level is not 0 (S56; NO), the sound signal generation unit 303 proceeds the process to S58. When it is determined that the envelope level has become 0 (S56: Yes), the sound signal generation unit 303 resets the read state flag D, the read state flag T, and the release state flag R to 0 (S57) and proceeds the process to S58.

As described above, according to the present disclosure, the sound similar to an acoustic piano can be reproduced by differently controlling the envelope of the string striking sound signal and the collision sound signal based on the operation to the damper pedal.

Second Embodiment

In the above embodiment, the string striking sound signal and the collision sound signal are stored as separate waveform data in the string striking sound waveform memory 305-1 and the collision sound waveform memory 305-2, respectively, and the waveform data is read out according to the depressing of the key. However, one waveform data may be read in response to the key depression, and the read waveform data may be divided into the string striking sound waveform and the collision sound waveform and processed individually to generate the string striking sound signal and the collision sound signal.

Figure 19:
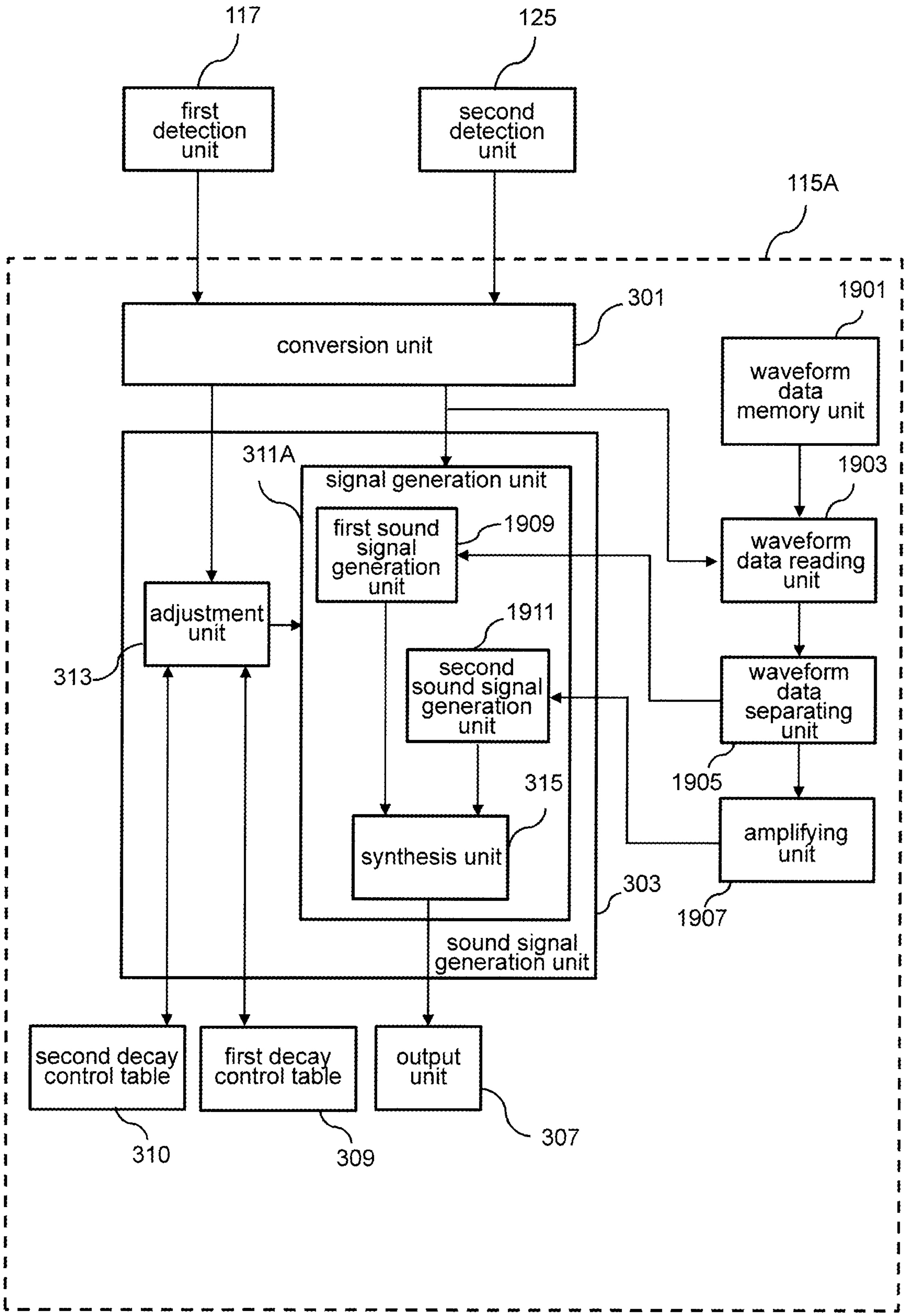
FIG. 19 is a block diagram showing a functional configuration of a sound generator according to another embodiment of the present disclosure.

FIG. 19 is a block diagram showing a functional configuration of a sound generator 115A according to the second embodiment of the present disclosure. In FIG. 19, configurations having the same or similar functions as those in FIG. 3 are denoted by the same reference numerals, and a repetitive description thereof is omitted. Referring to FIG. 19, the sound generator 115A includes the conversion unit 301, the sound signal generation unit 303 (sound signal generation device), a waveform data memory unit 1901, a waveform data reading unit 1903, a waveform data separating unit 1905, an amplifying unit 1907, the output unit 307, the first decay control table 309, and a second decay control table. The sound signal generation unit 303 includes a signal generation unit 311A and the adjustment unit 313. Hereinafter, a configuration different from that of the sound generator 115 according to the first embodiment will be mainly described.

In the sound generator 115A according to the second embodiment, the waveform data memory unit 1901 stores a plurality of waveform data. In the present embodiment, the waveform data is a waveform data obtained by sampling the sound of an acoustic piano. The plurality of waveform data includes waveform data of sounds including the string striking sound and the key bed collision sound accompanied with the key depression as waveform data to be read when the key 101 is depressed. The waveform data memory unit 1901 stores waveform data of respective velocity values corresponding to respective pitches. The waveform data is associated with, for example, a note number assigned to each pitch of the string striking sound.

Figure 20:
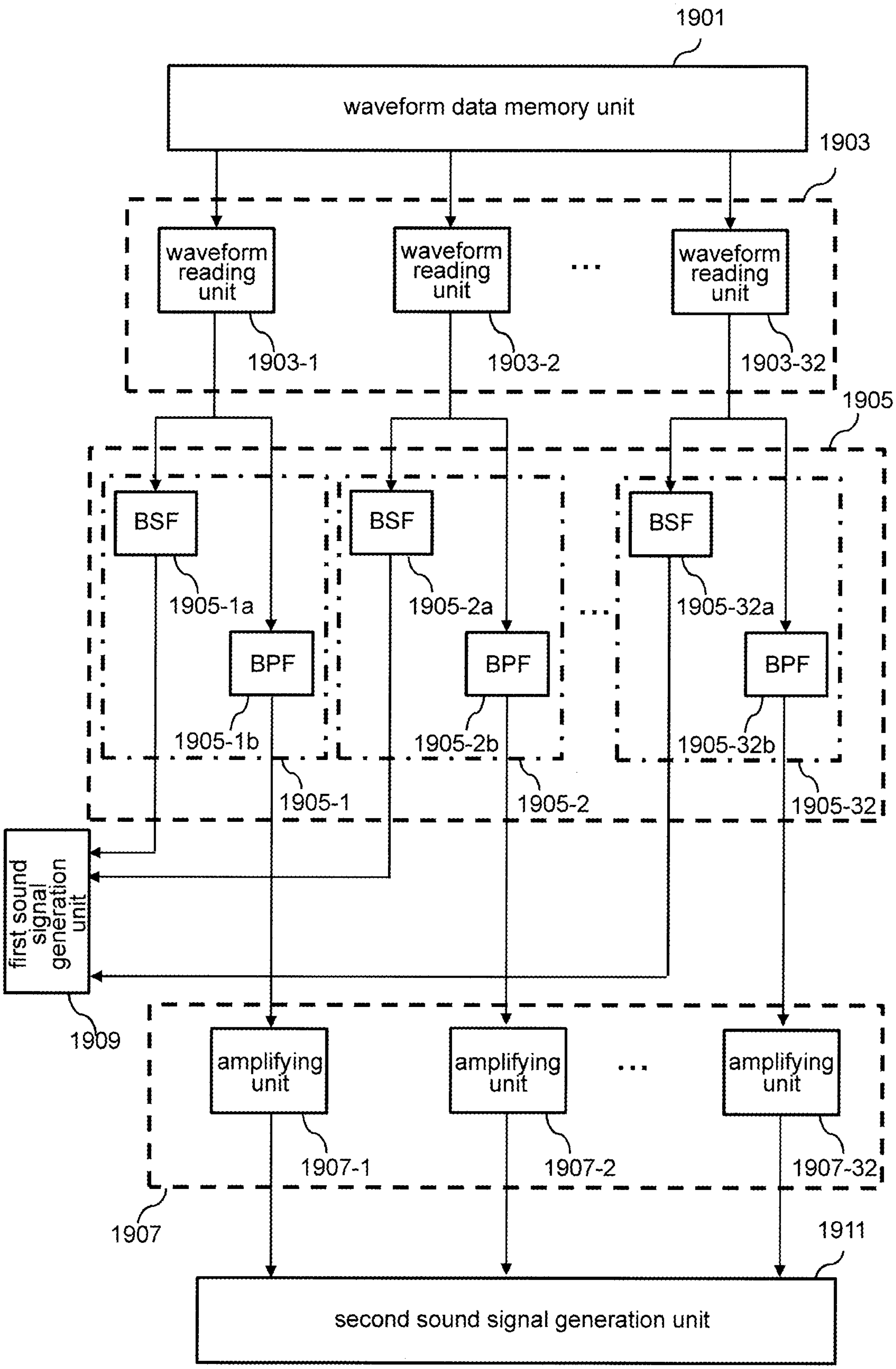
FIG. 20 is a block diagram showing an exemplary functional configuration of a waveform data reading unit, a waveform data separating unit and an amplifying unit according to another embodiment of the present disclosure.

FIG. 20 is a block diagram showing an exemplary functional configuration of the waveform data reading unit 1903 (1903-*i*, i=1~l), the waveform data separating unit 1905 (1905-*i*, i=1 HI), and the amplifying unit 1907 (1907-*i*, i=1 HI). Here, "I" corresponds to the number of sound signals that can be generated simultaneously by the keyboard instrument 100 (the number of sound signals that can be generated simultaneously by the signal generation unit 311A), and in this example, I is 32.

The waveform data reading unit 1903 selects and reads the waveform data to be read from the plurality of waveform data stored in the waveform data memory unit 1901 based on the first operation data (e.g., note-on signal Non, note number Note, velocity Vel) obtained from the control signal generation unit 401. The waveform data reading unit 1903 continues to read the waveform data until the sound signal is silenced in response to the note-off signal Noff. The waveform data reading unit 1903 (1903-*i*, i=1~l) outputs the read waveform data to the waveform data separating unit 1905 (1905-*i*, i=1~l).

The waveform data separating unit 1905 separates the waveform data into the string striking sound waveform data and the collision sound waveform data from the acquired waveform data. The waveform data separating unit 1905 (1905-*i*, i=1~l) may be composed of a combination of a band stop filter BSF (1905-*ia*: i=1~l) and a band pass filter BPF (1905-*ib*: i=1~l).

The band stop filter BSF decays the frequency band corresponding to the collision sound from the obtained waveform data and passes through the other frequency bands as it is. That is, the band stop filter BSF removes the data of the frequency band corresponding to the collision sound from the obtained waveform data, and outputs the data excluding the frequency band corresponding to the collision sound as the first sound signal which is the string striking sound waveform data. The first sound signal passing through the band stop filter BSF is output to the first sound signal generation unit 1909. On the other hand, the band pass filter BPF, from the obtained waveform data, passes through the frequency band corresponding to the collision sound as it is, to decay the other frequency bands. That is, the band pass filter BPF outputs the data of the frequency band corresponding to the collision sound from the obtained waveform data as the second sound signal which is the collision sound waveform data. The second sound signal passing through the band pass filter BPF is amplified based on a predetermined amplification factor in the amplifying unit 1907 (1907-*i*, i=1~l) and is output to a second sound signal generation unit 1911. The amplifying unit 1907 may be omitted.

Figure 21:
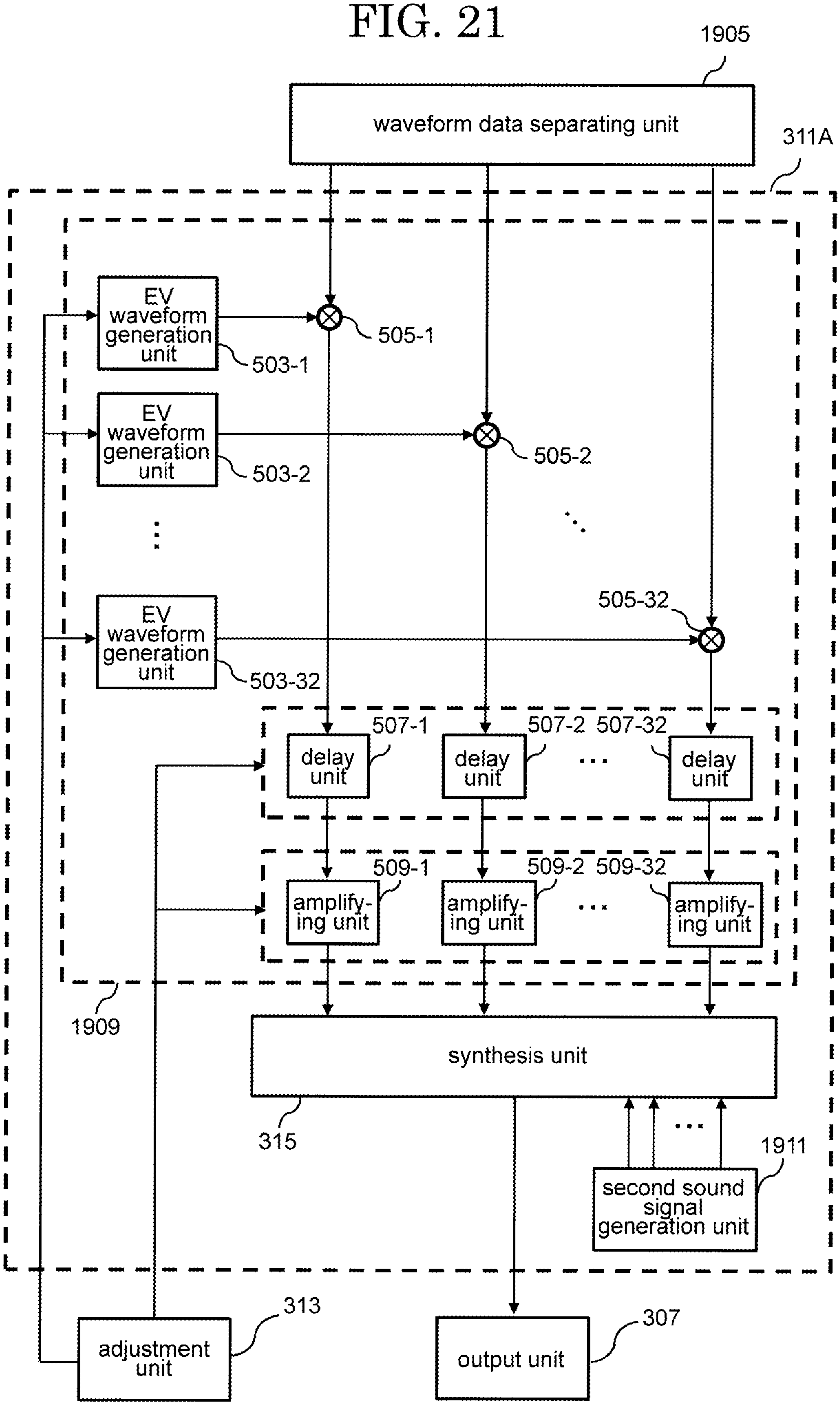
FIG. 21 is a block diagram showing an exemplary functional configuration of a first sound signal generation unit in a signal generation unit according to another embodiment of the present disclosure.

FIG. 21 is a block diagram showing an exemplary functional configuration of the first sound signal generation unit 1909 according to the signal generation unit 311A of the present embodiment. The first sound signal generation unit 1909 includes the EV (envelope) waveform generation unit 503 (503-*k*; k=1~n), the multiplier 505 (505-*k*; k=1~n), the delay unit 507 (507-*k*; k=1~n), and the amplifying unit 509 (509-*k*; k=1~n). Here, "n" corresponds to the number of sound signals that can be generated simultaneously by the keyboard instrument 100 (the number of sound signals that can be generated simultaneously by the signal generation unit 311A), and in this example, n is 32. Therefore, in the first sound signal generation unit 1909, the state in which the key is sounded up to 32 times is maintained, and when there is the 33rd depression while all are sounded, the sound signal corresponding to the first sound is forcibly stopped.

The first sound signal output from the band stop filter BSF (1905-*ia*: i=1~l) of the waveform data separating unit 1905 is output to the multiplier 505 of the first sound signal generation unit 1909. The multiplier 505 multiplies the obtained first sound signal by the envelope waveform generated in the EV waveform generation unit 503, and outputs it to the delay unit 507. The function of the EV waveform generation unit 503, the delay unit 507 and the amplifying unit 509 in the first sound signal generation unit 1909 are the same as the first embodiment described referring to FIG. 10, a detailed description in the present embodiment will be omitted.

Figure 22:
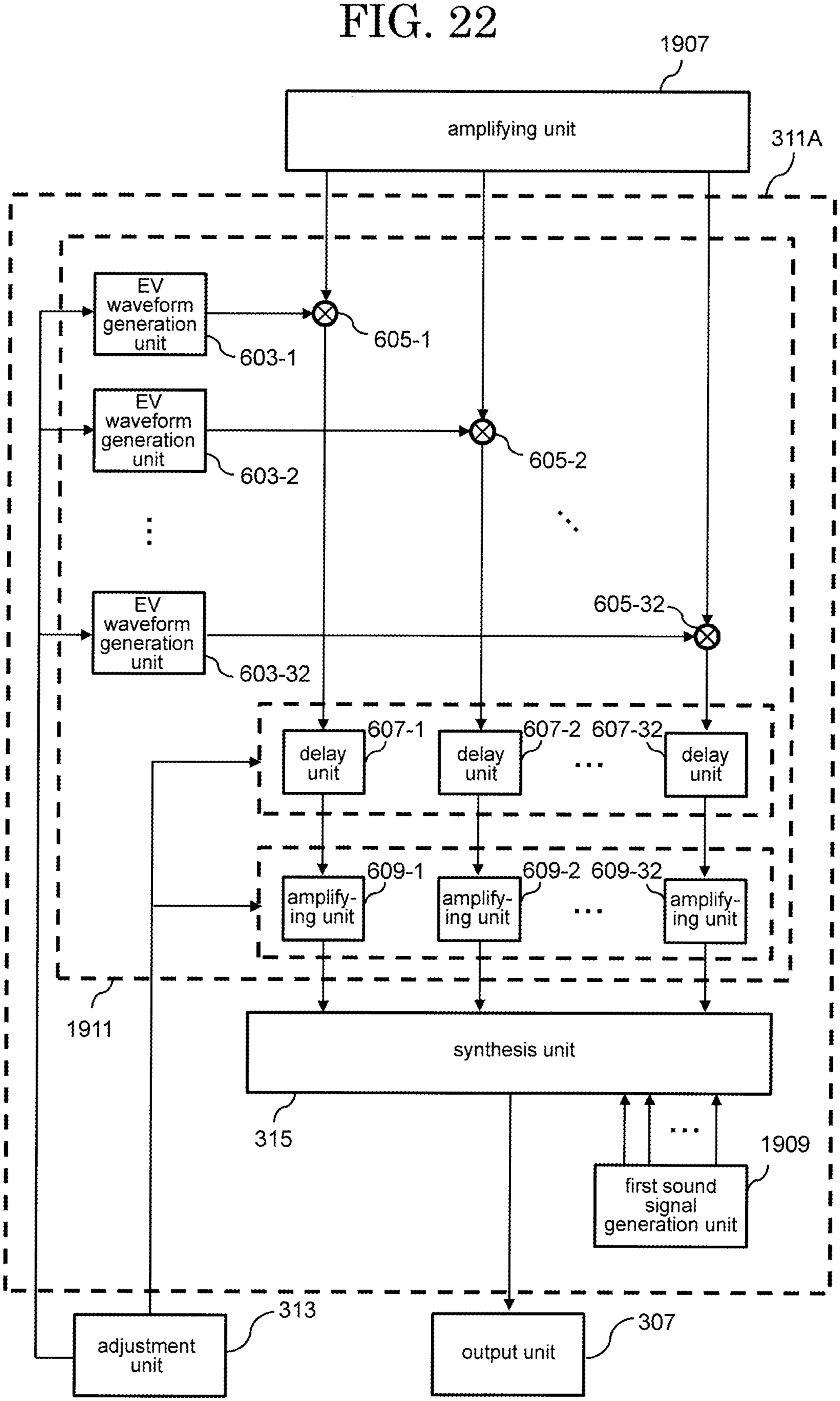
FIG. 22 is a block diagram showing an exemplary functional configuration of a second sound signal generation unit in a signal generation unit according to another embodiment of the present disclosure.

FIG. 22 is a block diagram showing an exemplary functional configuration of the second sound signal generation unit 1911 according to the signal generation unit 311A of the present embodiment. The second sound signal generation unit 1911 includes the EV (envelope) waveform generation unit 603 (603-*j*, j=1~m), the multiplier 605 (605-*j*, j=1~m), the delay unit 607 (607-*j*, k=1~m), and the amplifying unit 609 (609-*j*, j=1~m). Here, "m" corresponds to the number of sound signals that can be generated simultaneously by the keyboard instrument 100 (the number of sound signals that can be generated simultaneously by the signal generation unit 311A), and in this example, m is 32. Therefore, in the second sound signal generation unit 1911, the state in which the key is sounded up to 32 times is maintained, and when there is the 33rd depression while all are sounded, the sound signal corresponding to the first sound is forcibly stopped. "m" may be less than "n".

The second sound signal output from the amplifying unit 1907 (if the amplifying 1907 is omitted, the second sound signal output from the band pass filter BPF of the waveform data separating unit 1905 (1905-*ia*: i=1 HI)) is output to the multiplier 605 of the second sound signal generation unit 1911. The multiplier 605 multiplies the obtained second sound signal by the envelope waveform generated in the EV waveform generation unit 603, and outputs it to the delay unit 607. The functions of the EV waveform generation unit 603, the delay unit 607 and the amplifying unit 609 in the second sound signal generation unit 1911 are the same as the first embodiment described referring to FIG. 11, a detailed description in the present embodiment will be omitted.

The synthesis unit 315, as in the first embodiment described above, syntheses the first sound signal (the string striking sound signal) output from the first sound signal generation unit 1909 and the second sound signal (the collision sound signal) output from the second sound signal generation unit 1911, and outputs it to the output unit 307. The configuration of the sound generator 115A of the second embodiment has been described above.

In the second embodiment of the present disclosure, the sound generator 115A separates the waveform data into the string striking sound waveform data and the collision sound waveform data from the waveform data stored in the waveform data memory unit 1901 to generate the first sound signal and the second sound signal. The adjustment unit 313 controls the envelopes for the first sound signal and the second sound signal generated like this to be different based on the second operation data corresponding to the operation of the damper pedal 121 and it is possible to reproduce a sound similar to an acoustic piano.

In the first and second embodiments described above, the half pedal is not distinguished between the on-state side and the off-state side in its region (one state), the region of the half pedal is divided into a plurality, and the manner of decay of the string striking sound at each region may be changed.

In the first and the second embodiments described above, the key press speed is estimated to control the string striking sound and is based on it, it may be any physical quantity that can sound the string striking sound in an appropriate manner in accordance with the key operation. The same applies to collision sound control.

The following is a brief summary of an embodiment of this disclosure.

A sound signal generation device according to an embodiment of the present disclosure includes a signal generation unit and an adjustment unit. The signal generation unit generates a first sound signal and a second sound signal different from the first sound signal on the basis of first operation data corresponding to an operation of a key. The adjustment unit adjusts a relationship between the first sound signal and the second sound signal on the basis of the first operation data. Also, the adjustment unit controls a decay rate of the first sound signal to be different from a decay rate of the second sound signal on the basis of second operation data corresponding to an operation on a pedal. The sound signal generation device can be further configured as follows.

The adjustment unit may adjust the relationship between the first sound signal and the second sound signal to sound at respective timings according to a physical quantity of a key pressing operation of the key. Also, the adjustment unit may control the decay rate of the first sound signal to be different from the decay rate of the second sound signal on the basis of a key release operation of the key.

The pedal can be operated between a rest position and an end position. The adjustment unit may change the decay rate of the first sound signal from a first rate to a second rate, which is faster than the first rate, while may not change the decay rate of the second sound signal when the second operation data indicates that the pedal has moved from the end position to the rest position.

The adjustment unit may change the decay rate of the first sound signal from a third rate, which is faster than the first rate, to the second rate, which is faster than the second rate, while may not change the decay rate of the second sound signal when the second operation data indicates that the pedal has been moved from between the end position and the rest position to the rest position.

The adjustment unit may change the decay rate of the first sound signal from the third speed to the first speed, while may not change the decay rate of the second sound signal when the second operation data indicates that the pedal has been moved from between the end position and the rest position to the end position.

The physical quantity may be a value for a behavior of the key at a predetermined position in a pressing range of the key based on the first operation data.

The physical quantity may be a velocity or an acceleration of the key.

The relationship may include a relationship between the timing of the sound of the first sound signal and the second sound signal.

The relationship may include a relationship between a volume of the first sound signal and the second sound signal.

A sound signal generation device according to an embodiment of the present disclosure includes a signal generation unit and an adjustment unit. The signal generation unit generates a first sound signal and a second sound signal different from the first sound signal on the basis of first operation data corresponding to an operation of a key. The adjustment unit adjusts a relationship between the first sound signal and the second sound signal to sound at respective timings according to a physical quantity of a key pressing operation of the key. Also, the adjustment unit controls a decay rate of the first sound signal to be different from a decay rate of the second sound signal on the basis of a key release operation of the key.

A keyboard instrument according to an embodiment of the present disclosure includes any of the aforementioned sound signal generation device, the key, the pedal, a first detection unit and a second detection unit. The first detection unit outputs the first operation data corresponding to the operation of the key. The second detection unit outputs the second operation data corresponding to the operation on the pedal.

A sound signal generation method according to an embodiment of the present disclosure includes generating a first sound signal and a second sound signal different from the first sound signal on the basis of first operation data corresponding to an operation of a key, and adjusting a relationship between the first sound signal and the second sound signal to sound at respective timings according to a physical quantity of a key pressing operation of the key and controlling a decay rate of the first sound signal to be difference from a decay rate of the second sound signal on the basis of a key release operation of the key. The sound signal generation method can be further configured as follows.

Controlling the decay rate of the first sound signal to be difference from the decay rate of the second sound signal may include controlling the decay rate of the first sound signal to be different from the decay rate of the second sound signal when the first operation data indicates that a key has been released.

Controlling the decay rate of the first sound signal to be difference from the decay rate of the second sound signal may include controlling the decay rate of the first sound signal to be greater than the decay rate of the second sound signal when the first operation data indicates that a key has been released.

The physical quantity may be a value for a behavior of the key at a predetermined position in a pressing range of the key based on the first operation data.

The physical quantity may be a velocity or an acceleration of the key.

The relationship may include a relationship between the timing of the sound of the first sound signal and the second sound signal.

The relationship may include a relationship between a volume of the first sound signal and the second sound signal.

The physical quantity may be the acceleration of the key. The relative relationship between the timing of the sounding of the first sound signal and the second sound signal may vary based on the acceleration.

When the acceleration is relatively small, the timing of the sounding of the first sound signal may be before the timing of the sounding of the second sound signal. When the acceleration is relatively large, the timing of the sounding of the first sound signal may be later than the timing of the sounding of the second sound signal.

It is also within the scope of the present disclosure that a skill in art adds, deletes, or changes the design of a component, or adds, omits, or changes the conditions of a process as appropriate based on the configuration described as an embodiment of the present disclosure as long as the gist of the present disclosure is provided.

Even if it is other working effects which differ from the working effect brought about by the embodiment mentioned above, it is naturally understood that what is clear from the description of this Description, or what can be easily predicted by the skill in art is brought about by the present disclosure.

The invention claimed is:

1. A sound signal generation device for a keyboard including a pedal and a key, the sound signal generation device comprising:

at least one memory storing instructions; and a processor that implements the instructions to:

generate a first sound signal and a second sound signal different from the first sound signal based on first operation data corresponding to a first operation of the key; and adjust a relationship between the first sound signal and the second sound signal based on the first operation data to control a decay rate of the first sound signal to be different from a decay rate of the second sound signal based on second operation data corresponding to an operation on the pedal, wherein the relationship includes a relationship between a timing of the sounding of the first signal and the second sound signal, wherein the processor further adjusts the relationship between the first sound signal and the second sound signal to sound at respective timings according to a physical quantity of a key pressing operation of the key, wherein the physical quantity includes an acceleration of the key, wherein the timing of the sounding of the first sound signal is before the timing of the sounding of the second sound signal, in a state where the acceleration is relatively small, and wherein the timing of the sounding of the first sound signal is later than the timing of the sounding of the second sound signal, in a state where the acceleration is relatively large.

2. The sound signal generation device according to claim 1, wherein the processor implements the instructions to control the decay rate of the first sound signal to be different from the decay rate of the second sound signal based on a key release operation of the key.

3. The sound signal generation device according to claim 1, wherein the physical quantity is a value for a behavior of the key at a predetermined position in a pressing range of the key based on the first operation data.

4. The sound signal generation device according to claim 3, wherein the physical quantity further includes a velocity of the key.

5. The sound signal generation device according to claim 1, wherein:

the pedal is operable between a rest position and an end position, and the processor implements the instructions to change the decay rate of the first sound signal, from a first rate to a second rate, which is faster than the first rate, while not changing the decay rate of the second sound signal upon the second operation data indicating that the pedal has moved from the end position to the rest position.

6. The sound signal generation device according to claim 5, wherein the processor implements the instructions to further change the decay rate of the first sound signal, from a third rate, which is faster than the first rate, to the second rate, which is faster than the third rate, while not changing the decay rate of the second sound signal upon the second operation data indicating that the pedal has been moved from between the end position and the rest position to the rest position.

7. The sound signal generation device according to claim 6, wherein the processor implements the instructions to change the decay rate of the first sound signal, from the third rate to the first rate, while not changing the decay rate of the second sound signal upon the second operation data indicating that the pedal has been moved from between the end position and the rest position to the end position.

8. The sound signal generation device according to claim 1, the relationship includes a relationship between a volume of the first sound signal and the second sound signal.

9. A keyboard instrument comprising:

the sound signal generation device according to claim 1;

the key;

the pedal;

a first sensor that outputs the first operation data corresponding to the operation of the key; and a second sensor that outputs the second operation data corresponding to the operation on the pedal.

10. A sound signal generation device for a keyboard including a pedal and a key, the sound signal generation device comprising:

at least one memory storing instructions; and a processor that implements the instructions to:

generate a first sound signal and a second sound signal different from the first sound signal based on first operation data corresponding to an operation of a key, from among the at least one key; and adjust a relationship between the first sound signal and the second sound signal to sound at respective timings according to a physical quantity of a key pressing operation of the key to control a decay rate of the first sound signal to be different from a decay rate of the second sound signal based on a key release operation of the key, wherein the physical quantity includes an acceleration of the key, wherein a timing of the sounding of the first sound signal is before a timing of the sounding of the second sound signal, in a state where the acceleration is relatively small, and wherein the timing of the sounding of the first sound signal is later than the timing of the sounding of the second sound signal, in a state where the acceleration is relatively large.

11. A sound signal generation method for a keyboard including a pedal and a key, the method comprising:

generating a first sound signal and a second sound signal different from the first sound signal based on first operation data corresponding to an operation of the key; and adjusting a relationship between the first sound signal and the second sound signal to sound at respective timings according to a physical quantity of a key pressing operation of the key to control a decay rate of the first sound signal to be different from a decay rate of the second sound signal based on a key release operation of the key, wherein the relationship includes a relationship between a timing of the sounding of the first signal and the second sound signal, wherein the physical quantity includes an acceleration of the key, wherein the relationship between the timing of the sounding of the first sound signal and the second sound signal varies based on the acceleration, wherein the timing of the sounding of the first sound signal is before the timing of the sounding of the second sound signal, in a state where the acceleration is relatively small, and wherein the timing of the sounding of the first sound signal is later than the timing of the sounding of the second sound signal, in a state where the acceleration is relatively large.

12. The sound signal generation method according to claim 11, further comprising controlling the decay rate of the first sound signal to be different from the decay rate of the second sound signal upon the first operation data indicating that the key has been released.

13. The sound signal generation method according to claim 12, wherein the physical quantity is a value for a behavior of the key at a predetermined position in a pressing range of the key based on the first operation data.

14. The sound signal generation method according to claim 13, wherein the physical quantity further includes a velocity of the key.

15. The sound signal generation method according to claim 14, wherein the relationship further includes a relationship between a volume of the first sound signal and the second sound signal.

16. The sound signal generation method according to claim 11, further comprising controlling the decay rate of the first sound signal to be greater than the decay rate of the second sound signal upon the first operation data indicating that the key has been released.

* * * * *